(12) United States Patent
Österling

(10) Patent No.: US 9,049,689 B2
(45) Date of Patent: Jun. 2, 2015

(54) CONTROLLING CELL ACTIVATION IN A RADIO COMMUNICATION NETWORK

(75) Inventor: Jacob Österling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 620 days.

(21) Appl. No.: 13/201,601

(22) PCT Filed: Feb. 16, 2009

(86) PCT No.: PCT/SE2009/050160
§ 371 (c)(1),
(2), (4) Date: Aug. 29, 2011

(87) PCT Pub. No.: WO2010/093297
PCT Pub. Date: Aug. 19, 2010

(65) Prior Publication Data
US 2011/0305180 A1 Dec. 15, 2011

(51) Int. Cl.
| | |
|---|---|
| G08C 17/00 | (2006.01) |
| H04W 4/00 | (2009.01) |
| H04W 74/00 | (2009.01) |
| H04W 36/08 | (2009.01) |
| H04W 52/02 | (2009.01) |
| H04W 74/08 | (2009.01) |
| H04W 88/08 | (2009.01) |

(52) U.S. Cl.
CPC ............ *H04W 74/006* (2013.01); *H04W 36/08* (2013.01); *H04W 52/0274* (2013.01); *H04W 74/0833* (2013.01); *H04W 88/08* (2013.01); *H04W 52/0206* (2013.01)

(58) Field of Classification Search
USPC .................................. 370/311, 331; 455/436
See application file for complete search history.

(56) References Cited

U.S. PATENT DOCUMENTS

| | | | | |
|---|---|---|---|---|
| 5,991,629 | A  * | 11/1999 | Agrawal et al. ............... | 455/446 |
| 6,408,009 | B1 * | 6/2002 | Campbell et al. ............ | 370/461 |
| 6,584,330 | B1 | 6/2003 | Ruuska | |
| 2001/0016490 | A1 * | 8/2001 | Martin-Leon et al. ........ | 455/424 |

(Continued)

FOREIGN PATENT DOCUMENTS

| | | |
|---|---|---|
| CN | 101347008 A | 1/2009 |
| WO | 2007/048750 A1 | 5/2007 |

OTHER PUBLICATIONS

Myung, G., Technical Overview of 3GPP, May 17, 2008, pp. 1-40.*

*Primary Examiner* — Omar Ghowrwal
*Assistant Examiner* — Angel Brockman
(74) *Attorney, Agent, or Firm* — Coats & Bennett, P.L.L.C.

(57) ABSTRACT

A radio communication network (1) comprises at least a radio base station (10) serving an active cell (15) and a radio base station (20, 30, 40) having a passive cell (25, 35, 45) and does not transmit any cell-defining information for the passive cell (25, 35, 45). User equipment (100) receives random access enabling information applicable to the passive cell (25, 35, 45) from the radio base station (10) serving the active cell (15). The user equipment (100) uses this information for compiling and transmitting a random access to the radio base station (20, 30, 40) of the passive cell (25, 35, 45). Upon reception of the random access, the radio base station (20, 30, 40) activates its passive cell (25, 35, 45) and starts transmission of cell-defining information for the now activated cell (25, 35, 45) to assist user equipment (10) in finding the cell (25, 35, 45) for radio communication service.

22 Claims, 12 Drawing Sheets

(56) References Cited

U.S. PATENT DOCUMENTS

| | | |
|---|---|---|
| 2007/0006329 A1 | 1/2007 | Morrow et al. |
| 2007/0066329 A1 | 3/2007 | Laroia et al. |
| 2009/0290555 A1* | 11/2009 | Alpert et al. ............... 370/331 |
| 2009/0290561 A1 | 11/2009 | Kleindl |
| 2010/0080194 A1* | 4/2010 | Kawasaki et al. ............ 370/332 |

* cited by examiner

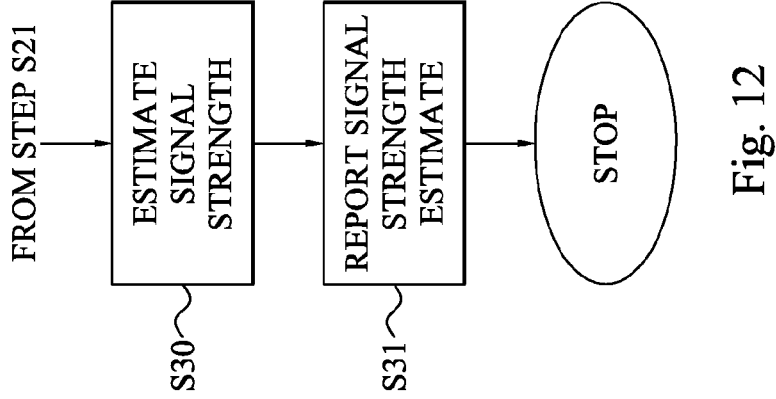
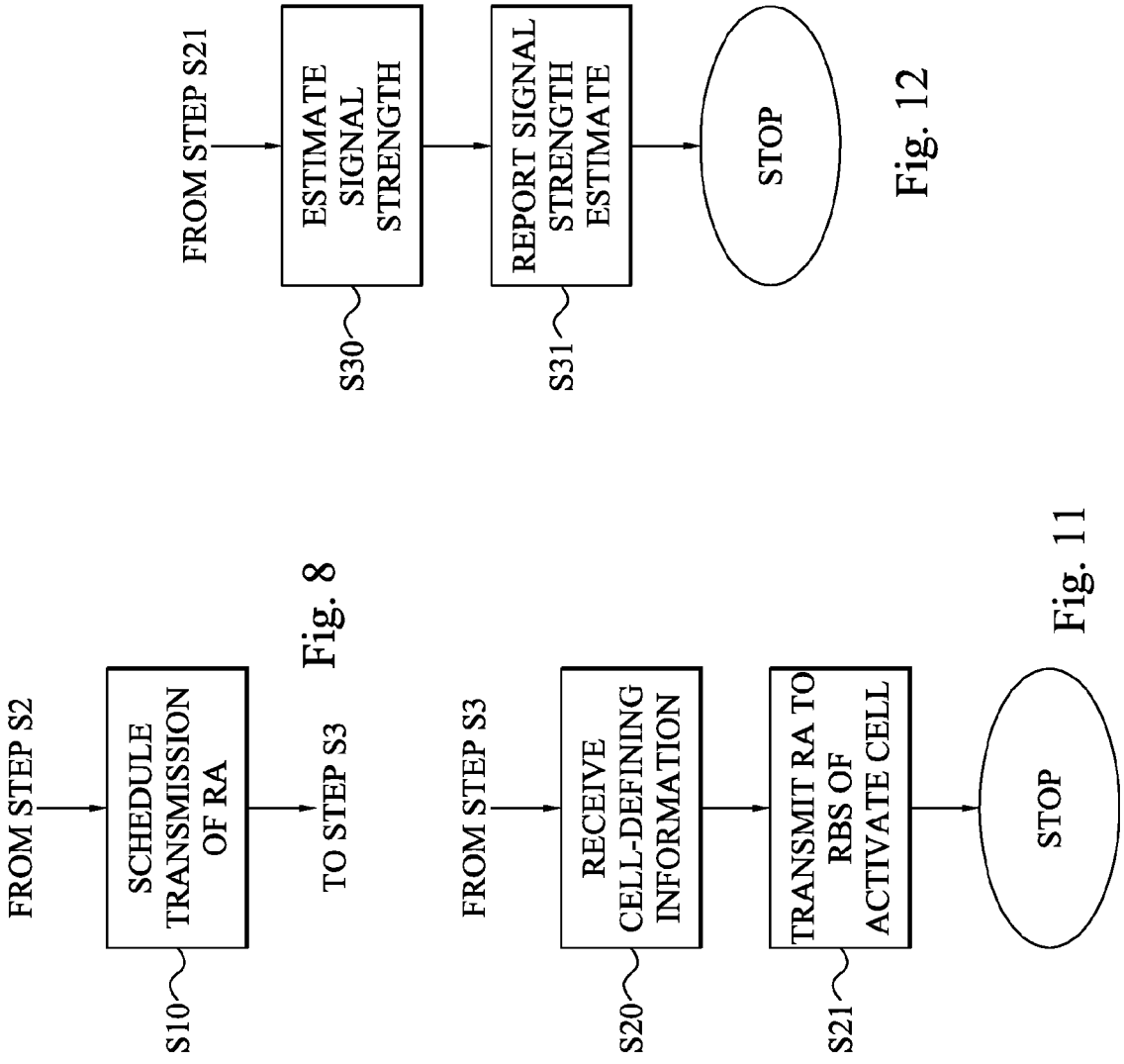
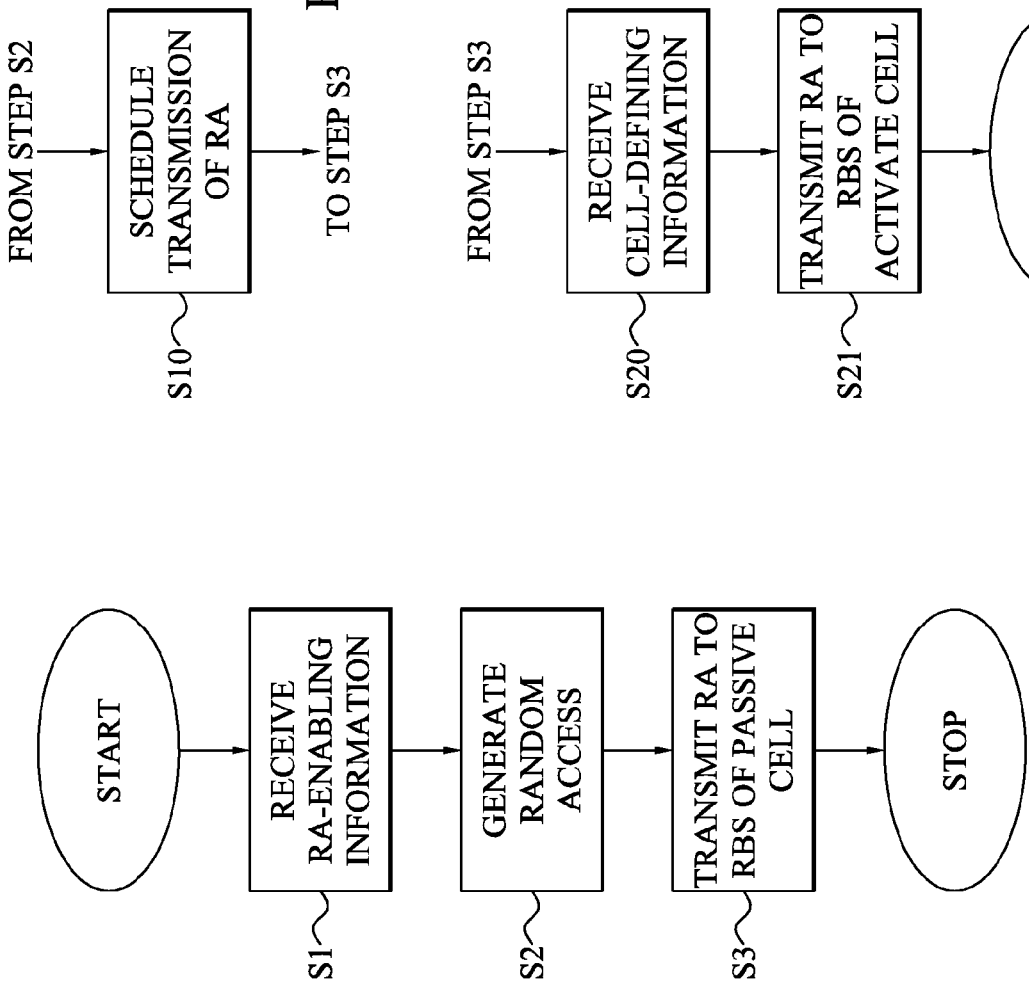

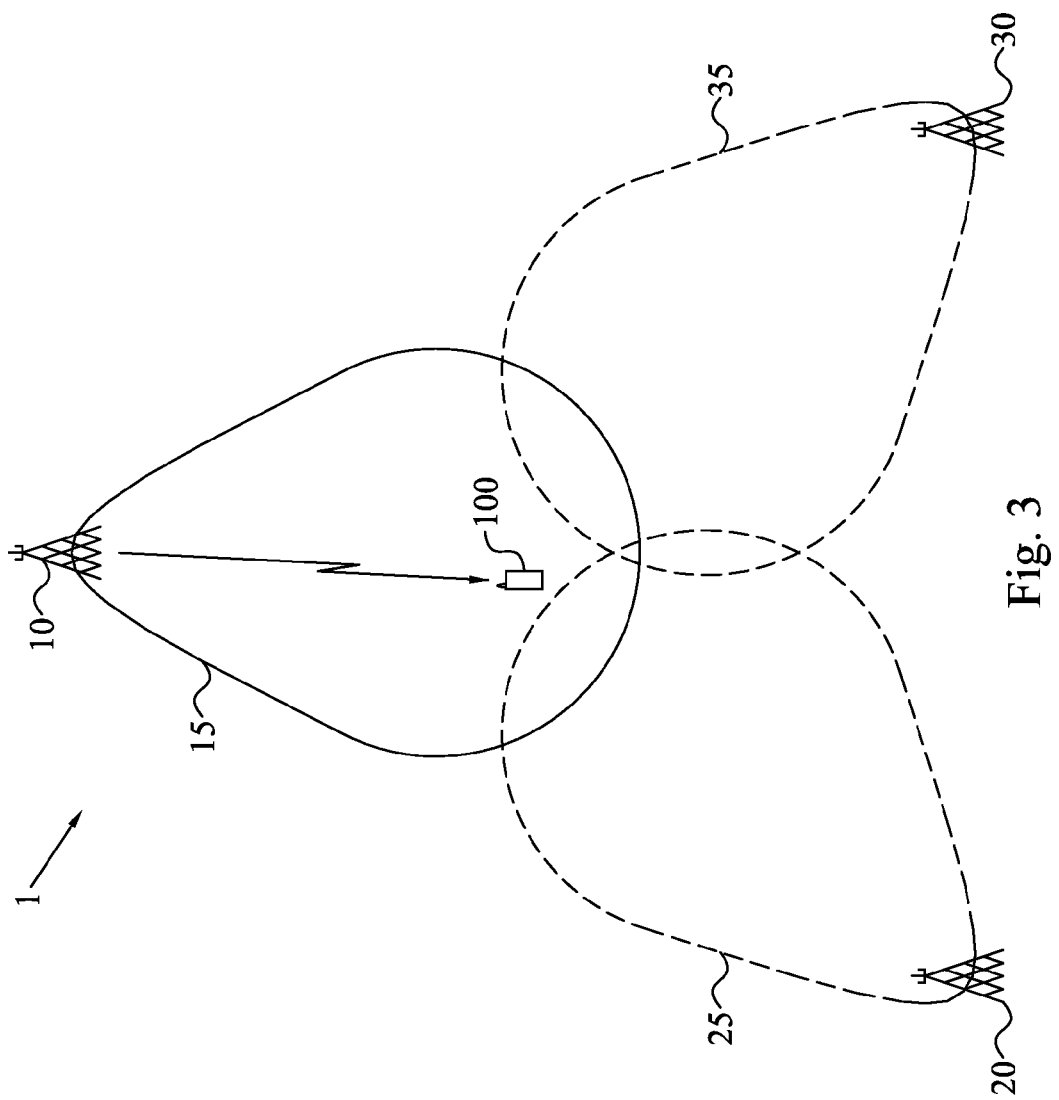
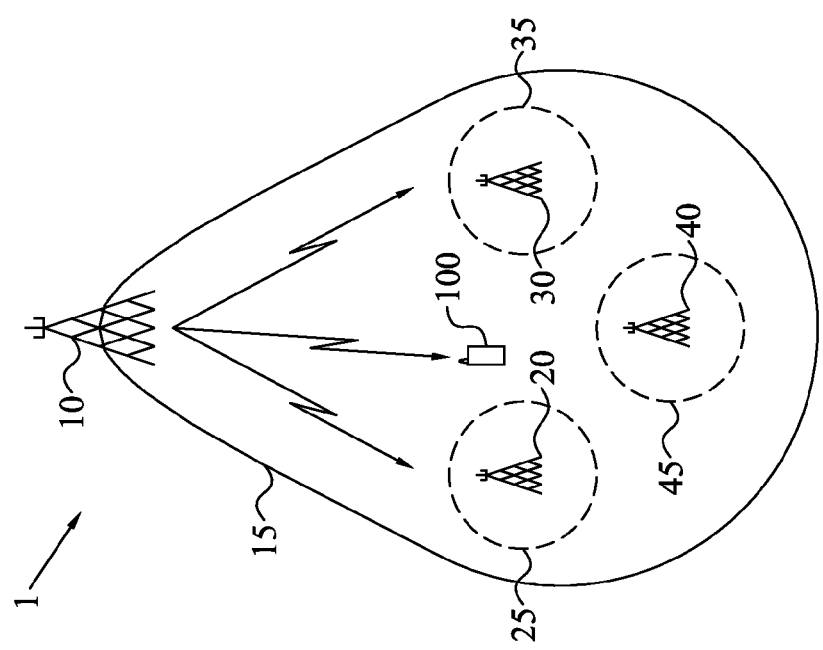

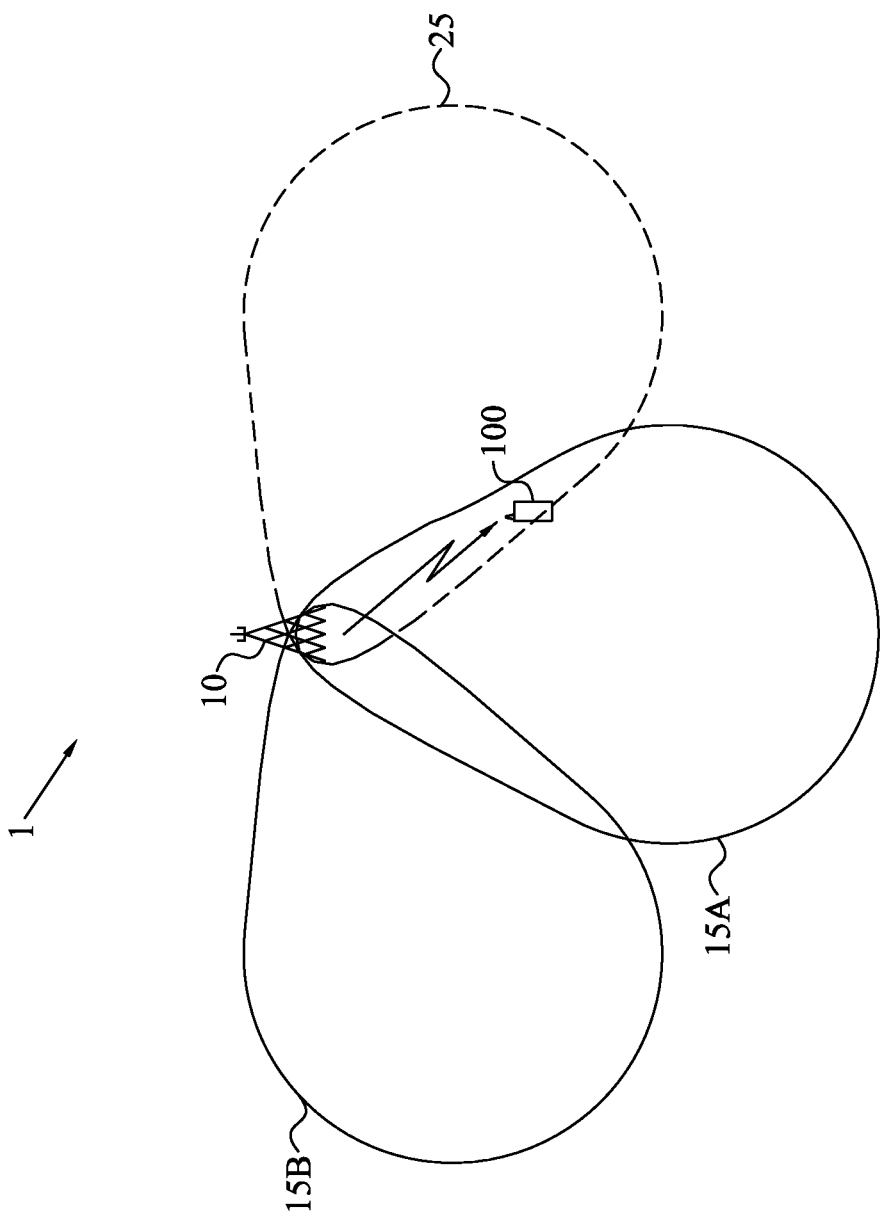

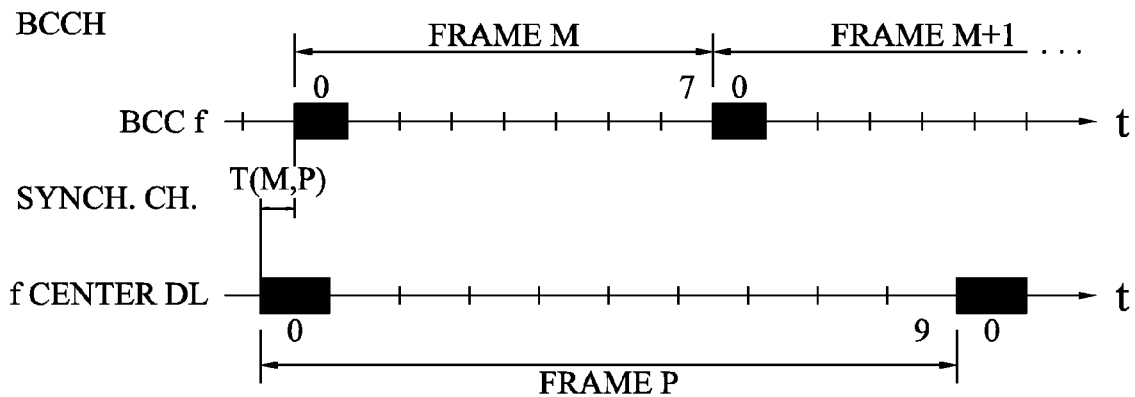
Fig. 10
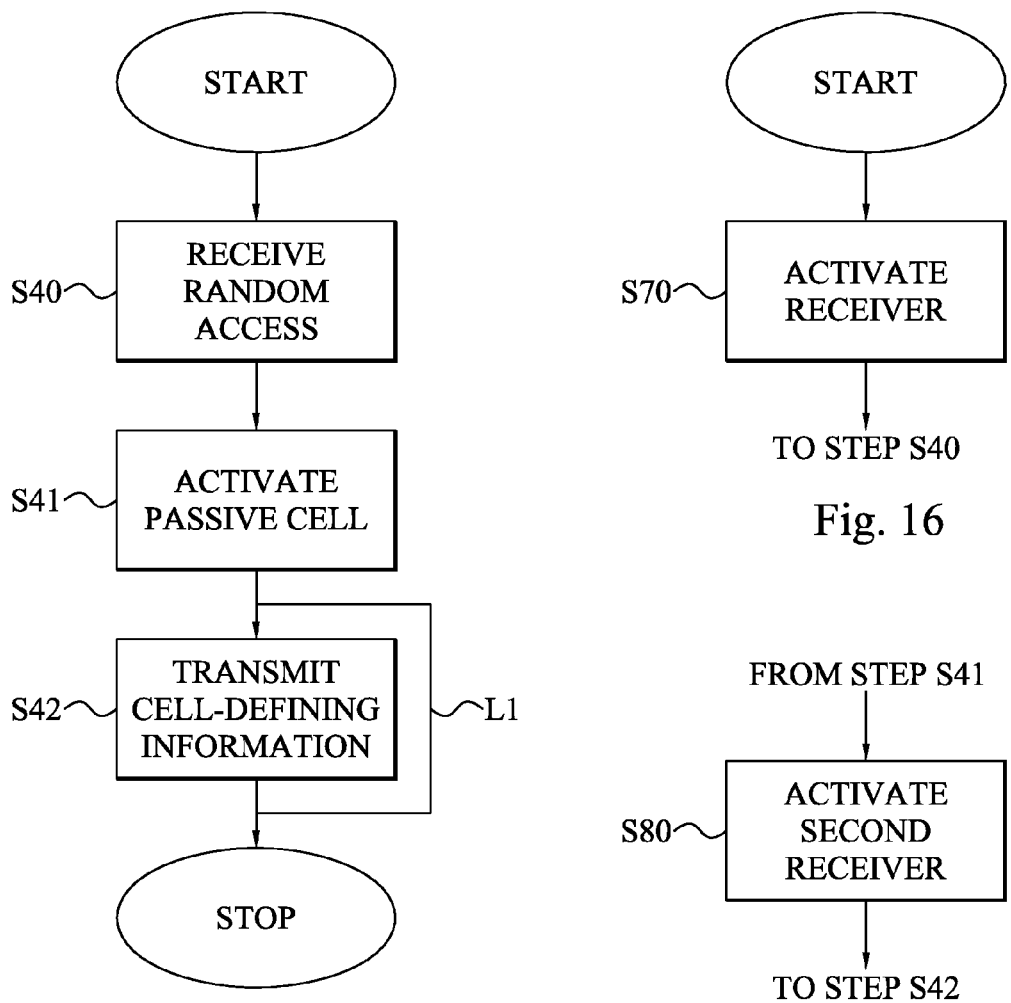
Fig. 13
Fig. 16
Fig. 17

CONTROLLING CELL ACTIVATION IN A RADIO COMMUNICATION NETWORK

TECHNICAL FIELD

The present invention generally relates to radio communications technology and operations in a radio communication network, and in particular to controlled cell activation in such a radio communication network.

BACKGROUND

Today, radio communication networks typically comprise radio base stations with associated cells that are continuously active. This means that the radio base stations more or less continuously transmit certain forms of signals in the cells to assist user equipment present in the radio communication network or user equipment attempting to connect thereto. Examples of such signals are pilot signals, such as reference and synchronization signals, and the broadcast channel. These signals are used for many purposes including downlink (DL) channel estimation, cell synchronization in connection with power-up of user equipment and mobility cell search.

In Wideband Code Division Multiple Access (WCDMA) a NodeB for a cell can be put to sleep at night by switching off the power supply to the NodeB in order to reduce power consumption. In the morning, the NodeB is turned on again by once more providing power supply to the NodeB.

SUMMARY

It is a general object to provide reductions in power consumption in a radio communication networks while still ensuring efficient communication services.

It is a specific object to control activation of at least one cell in a radio communication network.

These and other objects are met by embodiments as defined by the accompanying patent claims.

The possibility of temporarily inactivating cells into passive cells, where their associated radio base stations do not transmit any of the above-mentioned signals is sometimes advantageous. Such a cell inactivation could then be used for example during periods in which there is no need, or at least very low need, for radio communication services in the cells. Inactivating cells and turning off the transmitters of the passive cells not only saves power for the radio base stations but also contributes to lowering the total interference level in the radio communication network.

The inventor has recognized that the inactivation of cells during periods of no or low need for radio communication services not only achieves several advantages for the operators of the radio communication networks but also brings about new challenges. For instance, today there is no efficient solution of how to activate a passive cell when a potential need for radio communication services arises in the area of the passive cell. Furthermore, there is no efficient solution to inform user equipment of the existence of passive cells in the radio communication network.

A basic idea is controlling activation of a passive cell in a radio communication network by a random access transmitted by user equipment to a radio base station of the passive cell. The radio base station does not transmit any cell-defining information, such as pilot signals, including reference signals and synchronization signals, for the passive cell. The user equipment instead receives the information necessary for compiling and transmitting the random access from a radio base station managing another, active cell of the radio communication network.

The passive cell is activated based on the random access received by its radio base station. The radio base station of the now activated cell starts transmitting the cell-defining information for the cell. This transmitted cell-defining information may assist user equipment in finding the cell for radio communication service.

In this way, cells are allowed to stay passive for as long as possible to reduce power consumption, and also passive cells can be activated when needed to ensure satisfactory communication services for the users.

BRIEF DESCRIPTION OF THE DRAWINGS

The embodiments together with further objects and advantages thereof, may best be understood by making reference to the following description taken together with the accompanying drawings, in which:

FIG. 1 is a flow diagram illustrating a method of controlled cell activation according to an embodiment;

FIG. 2 is an overview of a radio communication system according to an embodiment;

FIG. 3 is an overview of a radio communication system according to another embodiment;

FIG. 7 is an overview of a radio communication system according to a further embodiment;

FIG. 8 is a flow diagram of an additional, optional step of the method of controlled cell activation in FIG. 1;

FIG. 10 is a diagram illustrating time synchronization between two random access technologies according to an embodiment;

FIG. 11 is a flow diagram of additional, optional steps of the method of controlled cell activation in FIG. 1;

FIG. 12 is a flow diagram of additional, optional steps of the method of controlled cell activation in FIG. 11;

FIG. 13 is a flow diagram illustrating a method of controlled cell activation according to another embodiment;

FIG. 16 is a flow diagram of an additional, optional step of the method of controlled cell activation in FIG. 13;

FIG. 17 is a flow diagram of an additional, optional step of the method of controlled cell activation in FIG. 13;

DETAILED DESCRIPTION

Figure 4:
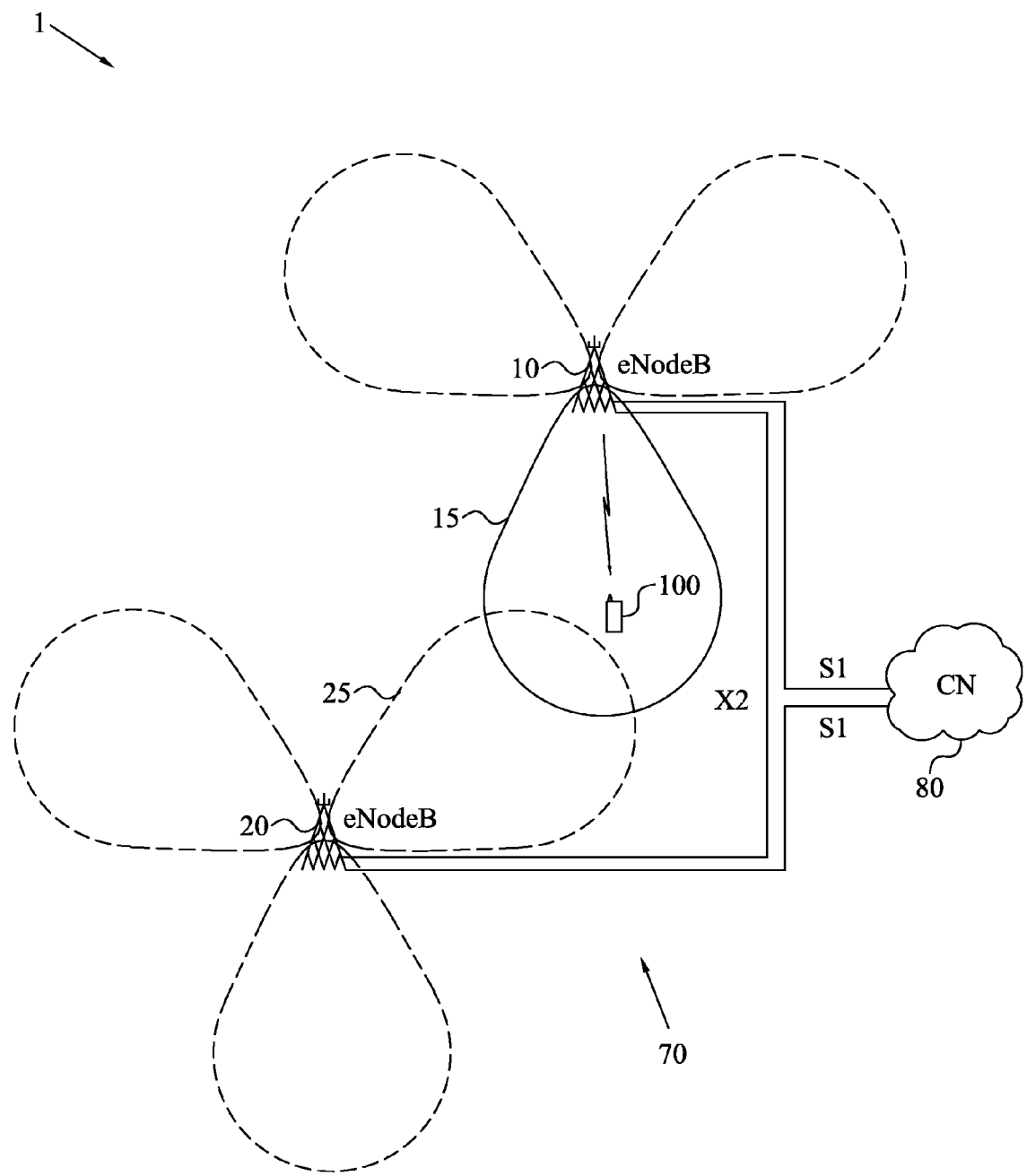
FIG. 4 is an overview of a radio communication system according to a further embodiment.

Throughout the drawings, the same reference characters will be used for corresponding or similar elements.

Embodiments as disclosed herein relate to controlling cell activation in a radio communication network having at least one passive cell.

In current cellular radio communication networks, the radio base stations continuously transmit certain forms of signals in their respective cells. Examples of such signals are pilot signals or pilots, such as reference signals and/or synchronization signals, and the broadcast channel. These signals are used for many purposes, including:

Data reception: Active user equipment needs to perform channel estimation, typically based on the pilot reference signals, to receive the transmitted data. The pilot reference signals may also be used for estimation and reporting of the downlink channel quality to support radio base station functions such as channel-dependent scheduling.

Mobility cell search: User equipment regularly scans for neighboring cells. The synchronization signals transmitted in a neighboring cell are used to find and synchronize to a potential neighbor. Active user equipment typically reports the signal strength of the neighboring cell to the network, which takes a decision if the user equipment should be handed over to the candidate cell.

Initial cell search: At power-up user equipment tries to find potential cells to connect to by scanning for synchronization signals. Once a cell is found and synchronization is obtained, the user equipment reads the broadcast channel and pilot signals transmitted in the cell to obtain the necessary system information and performs a random access to connect to the network.

User equipment synchronization: Idle user equipment needs synchronization signals and/or reference signals to be able to keep in sync with the network, i.e. once waking up from paging DRX (Discontinuous Reception) cycles, these signals are used to fine-tune timing and frequency errors etc.

When there are active users in a cell, the cost of transmitting the signals discussed above is justified. However, when there are no active users in the cell, there is in principle no need for these signals. This is especially true in scenarios with dense deployment of cells, e.g. in case where micro cells are placed under macro cells. In such scenarios, the micro cells are primarily used to cope with high load scenarios, and the energy spent on transmitting these signals from the micro cells in low load scenarios is in essence wasted.

In absence of active user equipment in a cell, or at least very low number of active user equipment, there is in principle no need to transmit anything. This allows the radio base station to turn off the power amplifier, the baseband processing as well as the transmission equipment. The cell managed by the radio base station in essence becomes "idle" in the downlink. Such a cell is denoted a passive cell herein, although alternative terminology could also be used, such as sleeping cell or inactivated cell. The expression "passive cell" therefore also encompasses expressions such as idle, sleeping or inactivated cell.

As defined herein, a passive cell is a cell of the radio communication network for which the corresponding radio base station is currently not transmitting any cell-defining information for the cell. The cell-defining information includes, in particular, information to assist user equipment in finding the cell. It may also include information required by user equipment for identifying and actually locking to a cell. The cell-defining information as defined herein comprises at least information required by user equipment for compiling and transmitting a random access to the radio base station of the cell. Cell-defining information typically comprises the information traditionally carried by the above-mentioned pilot signals, such as reference signals and/or synchronization signal, and optionally also information carried by the broadcast channel.

Note, however, that even though the radio base station does not transmit any cell-defining information for a passive cell, the radio base station may optionally still have its receivers switched on and can therefore receive data transmitted, for instance, by user equipment even though the transmitter or transmitters for the passive cell are switched off.

For the purposes of the present disclosure, a radio base station is assumed to serve one or more cells in the radio communication network. Thus, "radio base station" also refers to more recent entities, such as NodeB and eNodeB (evolved NodeB), which are capable of handling more than one cell, and other corresponding network nodes, such as base transceiver station (BTS) and base station (BS). Furthermore, in this disclosure the expression radio base station may also comprise wireless network nodes, such as relays and repeaters and home base stations having a respective geographical serving area, i.e. a cell.

Similarly, "user equipment" will be used to indicate different types of radio terminals, such as a mobile station, mobile user equipment, a laptop, etc. having functionality for wirelessly communicating with radio base stations in the radio communication network.

FIG. 1 is a flow diagram illustrating a method of controlling activation of at least one cell in a radio communication network. The radio communication network comprises at least one active cell, i.e. having an associated radio base station that transmits cell-defining information for the active cell, and at least one passive cell, i.e. having an associated radio base station that currently does not transmit any cell-defining information for the passive cell.

In a basic concept, the cell activation is effected by user equipment transmitting a random access to the radio base station for the passive cell. However, as the radio base station does not transmit any cell-defining information, including information required for compiling and transmitting a random access for the passive cell, the user equipment obtains this random access enabling information from another source as disclosed herein.

The method starts in step S1, where the user equipment receives random access (RA) enabling information applicable to the passive cell from a radio base station serving or managing an active cell in the radio communication network. This radio base station therefore not only transmits the cell-defining information applicable in its associated active cell but also transmits, such as unicast, multicast or broadcast, RA-enabling information applicable to the other, passive cell.

FIG. 2 is an overview of a portion of a radio communication network 1 according to an embodiment. In this example, a radio base station 10 manages an active cell 15 and therefore transmits cell-defining information for the active cell 15. The geographical area or service coverage of the cell 15 at least partly encompasses one or more, three in the example of FIG. 2, other cells 25, 35, 45 having comparatively smaller geographical areas. The active cell 15 is typically denoted a macro cell in the art, whereas the smaller cells 25, 35, 45 could be for example micro or pico cells.

In an embodiment, the micro cells 25, 35, 45 are currently passive, implying that their corresponding radio base stations 20, 30, 40 currently do not transmit any cell-defining information for the cells 25, 35, 45. The passive cells 25, 35, 45 are therefore invisible for user equipment 100 present in the area of or near a passive cell 25, 35, 45.

This scenario is advantageous, for example, if the radio base stations 20, 30, 40 of the passive cells 25, 35, 45 are planned to be used for particular services that cannot be handled or not handled sufficiently well by the radio base station 10 of the active cell 15. A typical example could be when the passive cells 25, 35, 45 and their radio base stations 20, 30, 40 are planned as broadband access technology, which only needs to be active when a service requiring high bandwidth is needed. If no such high bandwidth services are needed, the traffic is instead served by the overlapping access technology provided by the radio base station 10 and its active cell 15. In such a case, the active cell 15 and radio base station 10 may be of a first radio access technology, such as the Global System for Mobile Communications (GSM), Wideband Code Division Multiple Access (WCDMA), Code Division Multiple Access 2000 (CDMA2000) or Time Division-Synchronous CDMA (TDSCDMA), whereas the passive cells 25, 35, 45 and their radio base stations 20, 30, 40 may be of a second radio access technology, such as the Long Term Evolution (LTE), capable of handling high bandwidth services.

A further possible scenario could be that the passive cells 25, 35, 45 are only activated if the need for radio communication services in the macro cell 15 increases so much that the traffic in the macro cell 15 becomes too large for the radio base station 10 to handle effectively. In such a case, some of the traffic could instead be handled by at least one of the radio base stations 20, 30, 40 for the passive cells 25, 35, 45, which then first needs to be activated.

In either case, the RA-enabling information that the user equipment 100 needs in order to compile and transmit a random access to at least one of the radio base stations 20, 30, 40 of the passive cells 25, 35, 45 to potentially trigger an activation thereof is transmitted by the radio base station 10 of the active macro cell 15 to the user equipment 100.

The radio base station 10 preferably performs the information transmission in the form of a broadcast transmission as is schematically indicated in FIG. 2. In such a case, the system information or cell-defining information traditionally broadcast by the radio base station 10 is extended or complemented to also include the RA-enabling information need by the user equipment 100 to transmit the random access.

As is further described herein, the user equipment 100 receiving the broadcast RA-enabling information decides whether to compile and transmit a random access, for instance as a new radio communication service is to be activated by the user equipment and the radio base station 10 cannot effectively handle this service.

FIG. 3 illustrates another embodiment of a radio communication network 1, in which the controlled cell activation can be implemented. In this example, the radio communication network 1 comprises at least one active cell 15 having a radio base station 10 managing the cell 15 and transmitting the cell-defining information applicable for the active cell 15. The active cell 15 has one or more, two in the example illustrated in FIG. 3, passive neighboring cells 25, 35, the radio base stations 20, 30 of which having silent transmitters and therefore not transmitting any cell-defining information for the respective passive cells 25, 35.

In this scenario, the RA-enabling information that the user equipment 100 needs in order to compile and transmit a random access to the radio base station 20, 30 of a passive cell 25, 35 for the purpose of activating the cell 25, 35 and the radio base station transmitter is sent to the user equipment 100 from the radio base station 10 of the active cell 15.

The transmitting radio base station 10 is typically a currently serving radio base station 10 for the user equipment 100. The serving radio base station 10 could then decide whether to transmit, typically unicast, the RA-enabling information if there is a potential need for handover. Thus, the user equipment 100 could be traveling away from the radio base station 10 and towards the geographical area of one of the currently passive cells 25, 35. As the cells 25, 35 are passive and their radio base stations 20, 30 do not transmit any cell-defining information, the user equipment 100 cannot perform any signal strength measurements for the passive cells 25, 35. In order to enable such signal strength measurements for the neighboring passive cells 25, 35, the radio base station 10 transmits the RA-enabling information applicable to the passive cell or cells 25, 35 to the user equipment 100, allowing it to awake the passive cell or cells 25, 35 by transmitting the random access. Once the passive cells 25, 35 have been activated, traditional uplink and downlink signal strength measurements can be performed as usual and the candidate cells 25, 35 can be evaluated for the purpose of a potential handover.

Furthermore, cell activation need not only be used for the purpose of enabling signal strength measurements. In clear contrast, a target candidate cell could be selected even though its radio base station does not transmit any cell-defining information. In such a case, the cell is selected, for instance, from signal strength measurements by a co-sited radio base station of optionally another radio access technology. Alternatively, the target candidate cell could be selected based on the direction of movement of the user equipment away from the active cell 15 and knowledge of the spatial inter-relationship of the cells 15, 25, 35 in the radio communication system. The user equipment 100 therefore needs to activate the target candidate cell in order to perform a handover thereto. The serving radio base station 10 sends the RA-enabling information applicable to the target candidate cell to the user equipment 100.

In FIGS. 2 and 3, the radio base station transmitting the RA-enabling information to the user equipment is different from the radio base station of a passive cell, in which the transmitted RA-enabling information is applicable. The embodiments are though not limited there. The previously mentioned NodeB and eNodeB are radio base stations capable of serving multiple, i.e. at least two, cells. This is schematically illustrated in FIG. 7. In the radio communication network 1 of FIG. 7, a radio base station 10 has non-limitedly three associated cells 15A, 15B, 25, of which two are active and one is passive. The radio base station 10 typically comprises dedicated receivers and transmitters for the different cells 15A, 15B, 25. In such a case, the transmitters for the active cells 15A, 15B are currently active and transmit the respective cell-defining information applicable in these cells 15A, 15B. However, the transmitter for the passive cell 25 is currently inactive and does not transmit any cell-defining information for the passive cell 25.

When activating the passive cell 25, the transmitter in the radio base station 10 dedicated for one of the active cells 15A transmits the RA-enabling information applicable to the passive cell 25 to the user equipment 100. The user equipment 100 compiles and transmits a random access to the receiver of the radio base station 10 dedicated for the passive cell 25. Upon correct reception of the random access, the radio base station 10 activates its transmitter for the passive cell 25, which thereby becomes active as its associated transmitter starts transmission of the cell-defining information for the cell 25.

FIG. 4 is a schematic overview of an example of a radio communication network, illustrated as a LTE radio communication network 1. The figure illustrates the division of the radio communication network 1 into a radio access network (RAN) 70 and a core network (CN) 80. The LTE RAN has only one node type, the eNodeB 10, 20. Each eNodeB 10, 20 is in charge of a set of one or more cells 15, 25. The cells 15, 25 of an eNodeB 10, 20 do not need to be using the same antenna site but can have separate dedicated antenna sites.

In the example of FIG. 4, the eNodeB 10, 20 is normally in charge of a lot of functionalites, including single cell radio resource management (RRM) decisions, handover decisions, scheduling of user equipment in both uplink and downlink in its cells.

The X2 interface connects any eNodeB 10 in the radio communication network 1 with any other eNodeB 20. This X2 interface is mainly used to support active-mode mobility while may also be used for multi-cell RRM functions. Another interface, the S1 interface connects the eNodeB 10, 20 to the core network 80.

The core network 80 for LTE is often denoted Evolved Packet Core (EPC) to indicate that it is a radical evolution from the GSM/General Packet Radio Service (GPRS) core network. The EPC is developed as a single-node architecture with all its functions in one node, except the Home Subscriber Server (HSS) that is a node or database containing details of each user equipment subscriber that is authorized to use the LTE core network. The EPC connects to the LTE RAN 70 via the-above mentioned S1 interface, to the Internet via the SGi interface and to the HSS using the S6 interface.

Figure 5:
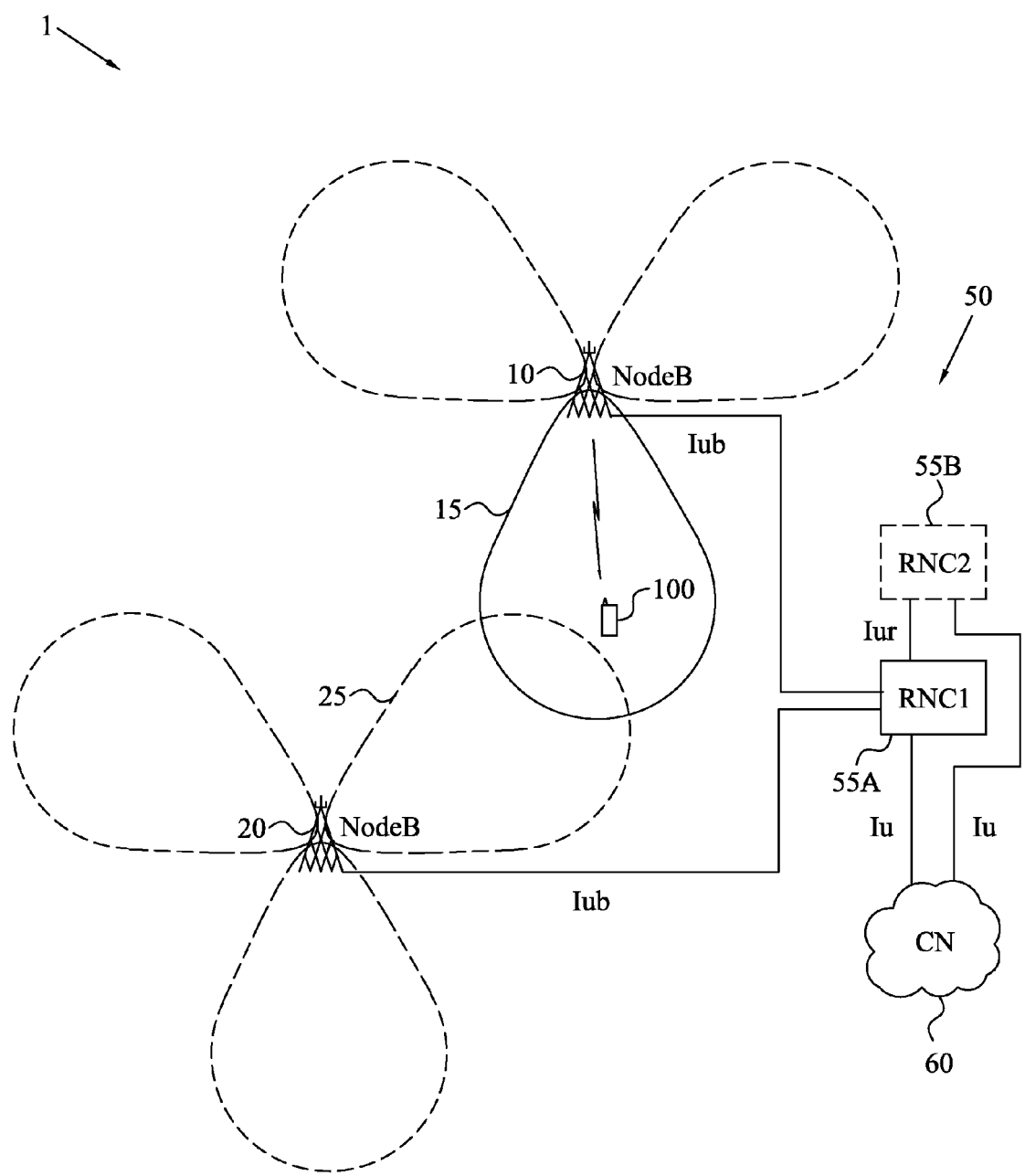
FIG. 5 is an overview of a radio communication system according to yet another embodiment.

FIG. 5 is a further schematic overview of an example of radio communication network, presented as a WCDMA/High Speed Packet Access (HSPA) radio communication network 1. The WCDMA/HSPA RAN 50 generally has two fundamental logical nodes: the Radio Network Controller (RNC) 55A, 55B and the node connecting to the antenna of the cells 15, 25, the NodeB 10, 20 or Radio Base Station (RBS).

The NodeB 10, 20 is the logical node handling the transmission and reception for a set of one or more cells 15, 25. Logically, the antennas of the cells 15, 25 belong to the NodeB 10, 20 but they are not necessarily located at the same antenna site. The NodeB 10, 20 owns its hardware but not the radio resources of its cells 15, 25, which are owned by the RNC 55A, 55B to which the NodeB 10, 20 is connected. This RNC-NodeB connection is effected using the Iub interface.

Each RNC 55A in the radio communication network 1 can connect to every other RNC 55B via the Iur interface. Thus, the Iur interface is a network wide interface making it possible to keep one RNC 55A as an anchor point for user equipment 100 and hide mobility from the core network 60.

The RNC 55A, 55B is the node connecting the RAN 50 to the core network 60 via the Iu interface. For WCDMA/HSPA, the core network 60 is normally based on the GSM core network and therefore comprises two distinct domains; the circuit-switched (CS) domain with the Mobile Switching Centre (MSC), and the packet-switched (PS) domain with the Serving GPRS Support Node (SGSN) and the Gateway GPRS Support Node (GGSN), which are not illustrated in the figure. Common for the two domains is the Home Location Register (HLR).

In the PS domain, the SGSN is connected to a GGSN via a Gn or Gp interface and the GGSN has its Gi interface out to external packet networks, such as the Internet.

The radio communication networks 1 illustrated in FIGS. 2, 3 and 7 can, for example, be a LTE or WCDMA/HSPA radio communication network as described above.

The embodiments can also be applicable in a radio communication network having multiple different RANs and optionally different radio access technologies (RATs). For instance in FIG. 2, the active cell 15 can belong to a first RAN and RAT, such as GSM, WCDMA, CDMA2000, TDSCDMA, whereas the passive micro cells 25, 35, 45 are of a second RAN and RAT, such as LTE. It is actually possible to have a same RAT but cells of different RANs. For instance, the active macro cell 15 could belong to a LTE RAN of a first operating frequency, such as LTE 700 MHz, and then having the passive micro cells 25, 35, 45 of a LTE RAN of a second operating frequency, such as LTE 2600 MHz.

Figure 6:
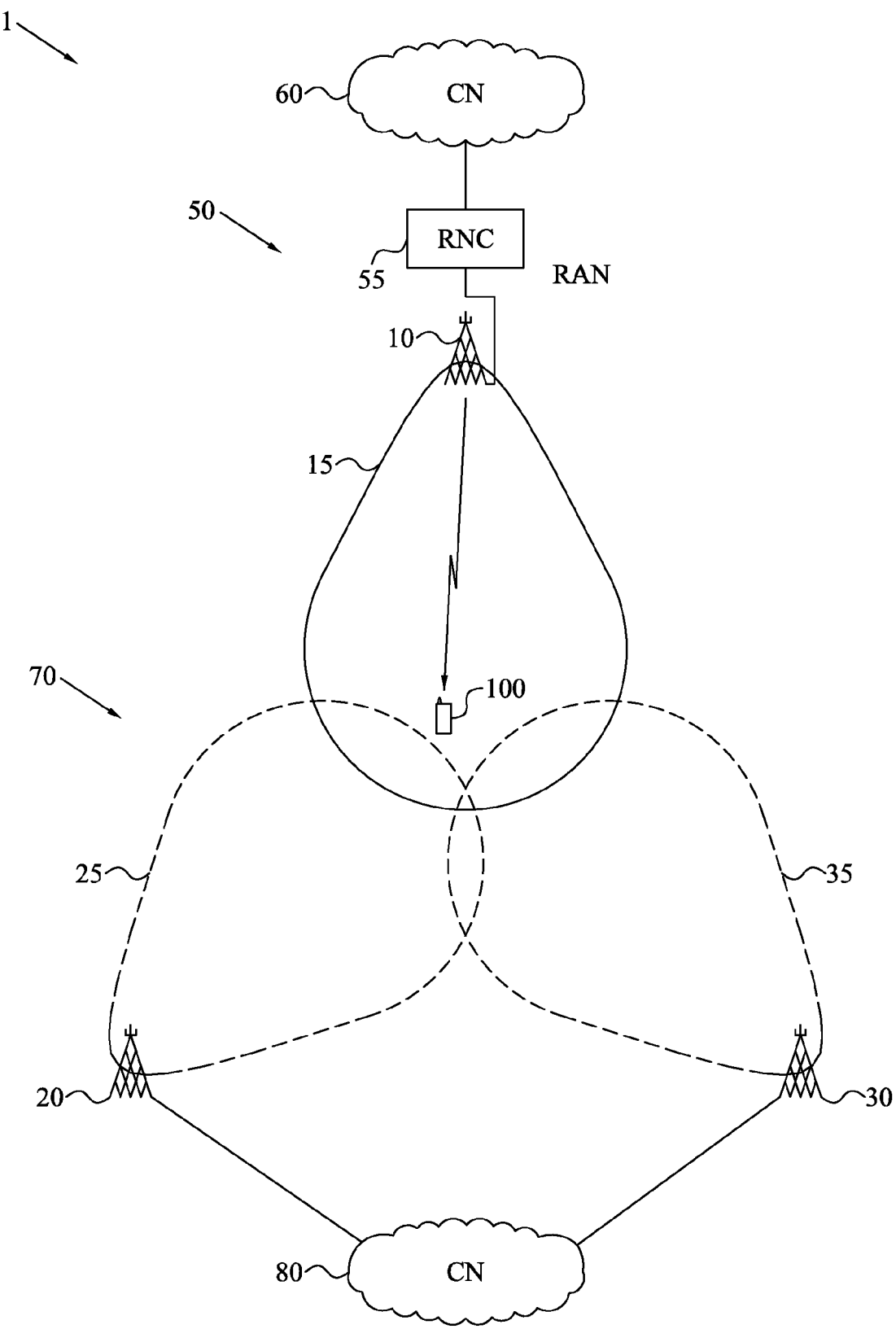
FIG. 6 is an overview of a radio communication system according to still another embodiment.

FIG. 6 is an overview of a radio communication network 1 with a combination of two different radio access networks 50, 70. One of these could be a WCDMA/HSPA RAN 50 as illustrated in FIG. 5 and the other could then be a LTE RAN 70 according to FIG. 4.

In FIG. 6, the LTE radio base stations 20, 30 have their transmitters turned off and therefore their associated cells 25, 35 are passive. If user equipment 100 currently connected to the WCDMA/HSPA RAN 50 and having a serving radio base station 10 of an active cell 15 is to initiate a radio communication services that is better handled by the LTE RAN 70, a handover procedure to a LTE cell 25, 35 and radio base station 20, 30 should be initiated.

As an example, the WCDMA/HSPA core network 60 decides whether a passive LTE cell 25, 35 should be turned on, typically depending on a desired radio communication service of the user equipment 100 and/or subscriber privileges of the user equipment 100. Thus, if the core network 60 concludes that the user equipment 100 should use LTE, it complies and sends a RA-provoking message towards the user equipment 100. The RA-provoking message comprises the necessary RA-enabling information applicable to the at least one passive LTE cell 25, 35 to activate. The core network 60 can use Non-Access Stratum (NAS) signaling to transmit the RA-provoking message through a RNC 55 and the serving radio base station 10 to the user equipment 100.

Also signaling between a LTE network and a WCDMA/HSPA network is possible. This is solved by allowing the WCDMA/HSPA to connect to the EPC. More precisely, the SGSN of the core network is connected to the EPC through the S3 or S4 interface. If a handover from WCDMA/HSPA to LTE is needed, the connection is taken over by the EPC from the SGSN through the S3 interface. The S4 interface is used when the EPC acts as a GGSN by routing traffic through the WCDMA/HSPA RAN.

Returning to FIG. 1, the user equipment has received the RA-enabling information from a radio base station, such as according to any of the procedures discussed above in connection with FIGS. 2, 3, 6 and 7. In a next step S2, the user equipment uses the received RA-enabling information for compiling a random access that is transmitted to the radio base station of the passive cell in step S3. Upon correct reception of the random access, the radio base station turns on its transmitter or transmitters for the purpose of starting transmission of the cell-defining information for the now activated cell. This transmitted cell-defining information allows the user equipment and/or other user equipment to identify the cell for radio communication service. For instance, the user equipment can now estimate signal strengths on the received downlink data from the radio base station and/or the user equipment can connect to or perform a handover to the activated cell and radio base station.

If no passive cell becomes activated by the random access transmission of step S3, the user equipment can be configured for repeating the transmission of the random access at least once.

The method then ends.

In a particular embodiment of the invention, the RA-enabling information comprises information of a frequency at which the random access should be transmitted. The information also comprises some data that the radio base station of the passive cell is responsive to and triggers activation of the cell and radio base station transmission. In LTE and WCDMA, such data could be the RA preamble that is generally the first data that user equipment sends to a radio base station of an active cell in the art. The preamble can be based on Zadoff-Chu (ZC) sequences and cyclic shifted sequences thereof. In the art, preamble sequences are partitioned into groups of 64 sequences each. Each cell is then allocated one such group by defining one or several root Zadoff-Chu sequences and the cyclic shifts required to generate the set of preambles. The RA-enabling information could therefore include one or more of the preambles applicable in the passive cell or data allowing the user equipment to calculate one or more preambles for the passive cell.

The radio base station transmitting the RA-enabling information on behalf of a passive cell has therefore access to the preamble and RA frequency for the passive cell. In a LTE network, the X2 interface can be used between neighboring or macro/micro cells and radio base stations for the purpose of distributing information of the RA frequencies and preambles that are applicable in the respective cells.

If the radio base station transmitting the RA-enabling information belongs to another RAN or even another RAT than the passive cells, the RA frequency and preamble information can be forwarded from the RAN of the passive cell to the RAN or CN associated with the transmitting radio base station. The S3/S4 interface could then be used for communication between LTE and WCDMA core networks.

The random access transmitted by the user equipment based on the received RA-enabling information can be asynchronous or synchronous. In the former case, the radio base station of the passive cell is not aware of when a random access is to be expected from user equipment for the purpose of activating its cell. As a consequence, the receiver or receivers of the radio base station for the passive cells should be continuously active in order to receive any transmitted random access.

However, in synchronous random access, the radio base station can also have its receiver or receivers turned off for the majority of time. The at least one receiver need then only be active at pre-defined time periods or RA time slots assigned for random access. In such a case, the user equipment is scheduling transmission of the random access at one such RA time slot.

The user equipment therefore preferably receives, preferably in the RA-enabling information, synchronization information that can be used by the user equipment for identifying a relevant RA time slot, during which the random access should be transmitted to the radio base station of the passive cell. The synchronization information could, for example, be descriptive of a time synchronization between the radio base station transmitting the RA-enabling information and the radio base station of the passive cell to active.

If both radio base stations belong to a same RAT and RAN, and in particular LTE RAN, they are usually time synchronized, i.e. share a common time base, such as the Global Positioning System (GPS) time. The timing of RA time slots to use for transmitting the random access for the passive cell can then be expressed in relation to the timing of the DL synchronization channel of the radio base station transmitting the RA-enabling information. The user equipment then simply calculates or identifies a correct time slot to use for the random access transmission.

Also radio base stations belonging to different RANs or even different RATs can be time synchronized by both being synchronized to a common time base. In such a case, the radio base station transmitting the RA-enabling information also includes data descriptive of the relationship between the frame structures of the different RANs/RATs. This synchronization data is preferably included in the RA-enabling information or could be transmitted separately.

FIG. 10 schematically illustrates an example of time relationships between the frame structures of a GSM network in the top and a LTE network in the bottom. The relative frame structure time, T(M,P), between frame M of the GSM Broadcast Control Challen (BCCH) and frame P of the LTE DL synchronization channel is defined and transmitted to the user equipment as synchronization data.

If the random access is triggered by the core network of one RAN, the RAN can intercept the RA-provoking message from the core network and complement it with the relevant synchronization information as the core network generally is unaware of the RA time slot to use for the passive cell of the other RAN. However, if such RA time slot information has been conveyed between the core networks of the different RANs, the RA-provoking core network could instead include the synchronization data and its RAN does not have to complement with the RA-provoking message.

Time synchronization can also be achieved if the radio base station of the passive cell is co-sited with the radio base station having an active cell and transmits the RA-enabling information. In such a case, there can be a synchronization interface between the radio base stations allowing exchange of synchronization information, such as the relative frame structure time T(M,P).

If the user equipment has received synchronization data together in or separate from the RA-enabling information FIG. 8 illustrates a further preferred operation step of the controlling method in FIG. 1. The method continues from step S2 in FIG. 1. In a next step S10, the user equipment schedules transmission of the random access to a RA time slot identified based on the received synchronization information. The method continues to step S3 of FIG. 1, where the generated random access is transmitted at the scheduled RA time slot.

Figure 9A:
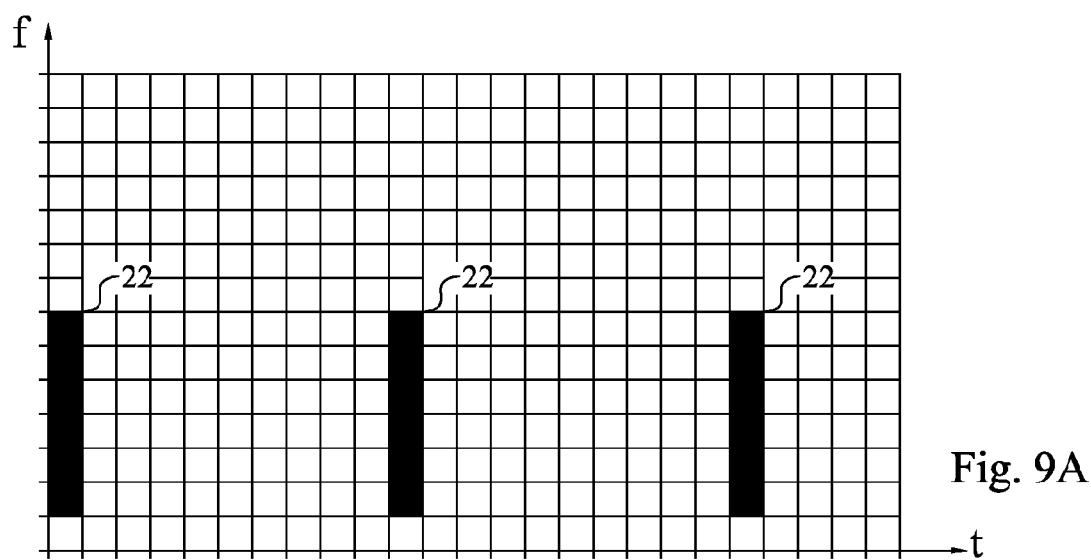
FIGS. 9A to 9C are frequency versus time diagrams illustrating usage of random access time slots according to different embodiments.

FIG. 9A is a frequency versus time diagram, in which RA time slots 22 applicable for a passive cell is illustrated. These RA time slots 22 and the time slots of FIGS. 9B and 9C have been exemplified with a LTE network, in which a RA time slot has a bandwidth corresponding to six resource blocks, i.e. 1.08 MHz, and a time duration of 1 ms. The teaching of using dedicated RA time slots can, however, be applied to other radio access technologies having other RA time slot or RA radio resource types and distributions.

The RA time slots 22 in FIG. 9A can be dedicated or specific to the passive cell to activate. The receiver or receivers of the radio base station of the passive cell then only need to be active during these RA time slots 22, thereby saving even further more power for the radio base station.

Figure 9B:
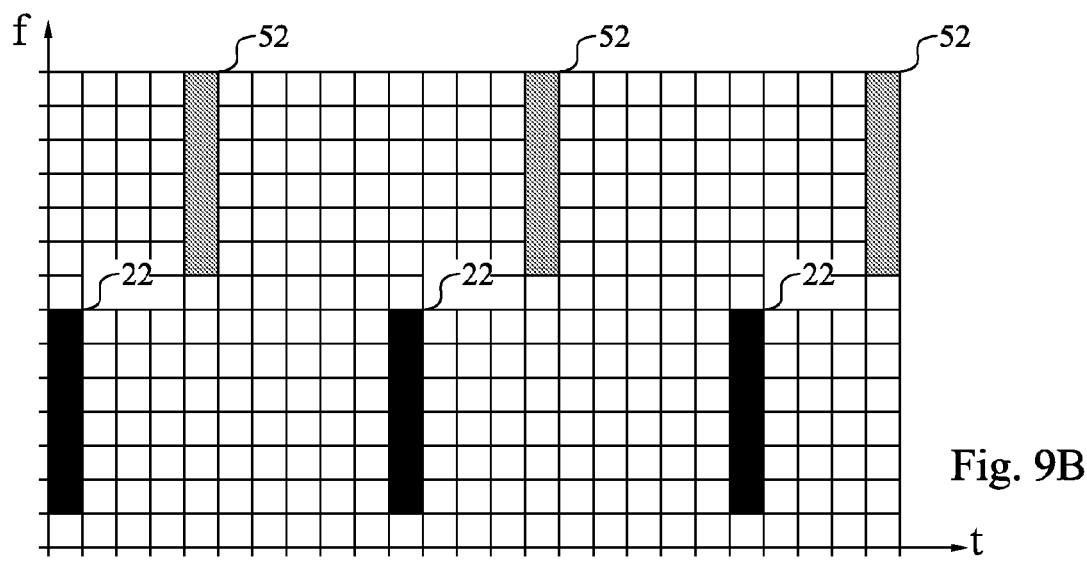

FIG. 9B illustrates another example of RA time slots 22, 52. In this case, a radio base station of a passive cell can be extended to listen to more than the RA time slots 22 dedicated for its passive cells, namely also a so-called RA group time slot 52. Alternatively, the radio base station only listens to the RA group time slots 52 and not to its own dedicated RA time slots 22 or the radio base station might not have any assigned dedicated RA time slots 22.

A RA group time slots 52 is shared by multiple passive cells present in a given geographical area of the radio communication network. These multiple cells could be micro/pico cells present in the radio coverage area of a macro cell as illustrated in FIG. 2 or the multiple cells could be in one GSM location area (LA).

The random access transmitted by the user equipment 100 may still be dedicated to one of the passive cells 25, 35, 45 due to usage of separate preambles for the different passive cells 25, 35, 45. Alternatively, the preamble transmitted by the user equipment 100 in the random access could indeed trigger multiple of the passive cells 25, 35, 45 to become active as is further described herein.

Figure 9C:
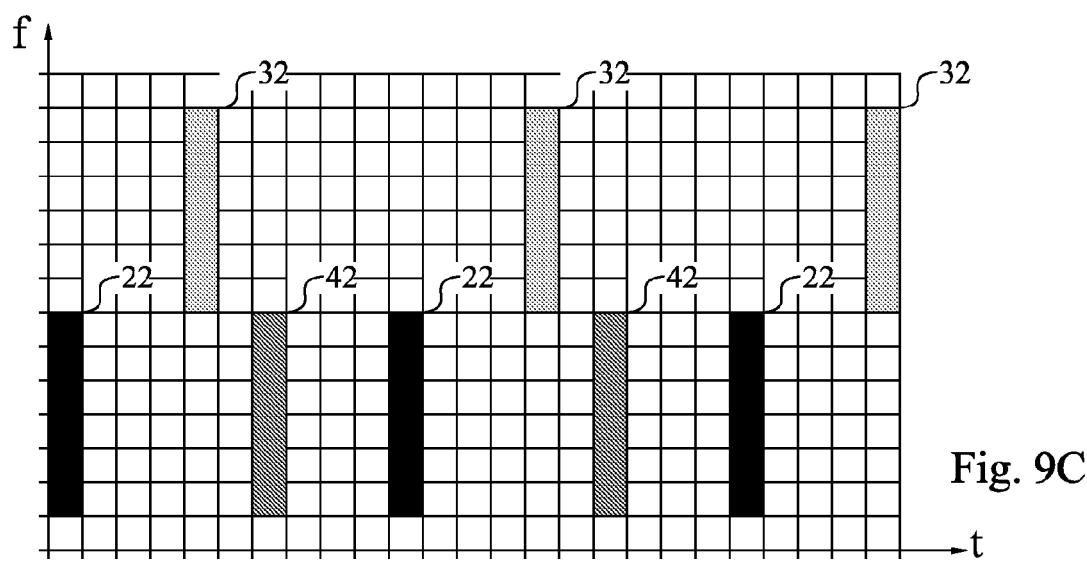

A further approach is illustrated in FIG. 9C, where a radio base station does not only listen to its dedicated RA time slots 22 but also to RA time slots 32, 42 of at least one of its neighboring cells. Alternatively, the radio base station only listens to the RA time slots 32, 42 of its neighboring cells.

FIG. 3 illustrates a radio communication network 1 for which a radio base station 20 can listen to the RA time slots 32, 42 of its neighboring cells 15, 35. If the radio base station 20 detects a random access in a RA time slot 32, 42 of one of its neighboring cells 15, 35 at sufficiently high signal strength, it activates its cell 25 and starts transmission of the cell-defining information.

The concept of RA time slots in FIGS. 9A to 9C may also be combined so that a radio base station could only listen to RA time slots 32, 42 of neighboring cells and a RA group time slot 52. Alternatively, the radio base station has its receiver or receivers active during its own dedicated RA time slots 22, during the RA group time slot 52 and the RA time slots 32, 42 of its neighboring cells.

As a further concept, the radio base station could have first dedicated RA time slots that are used when its cell is passive. However, once the cell is activated, the radio base station listens to second dedicated RA time slots that could possibly have another frequency and/or time position in a frame than the first dedicated RA time slots. In the former case, the radio base station can have a first receiver or first set of receivers tuned to a first frequency. Once the first receiver(s) capture(s) a random access, a second receiver or second set of receivers are activated and used for the data reception when the cell is active.

In a traditional prior art random access procedure, such as illustrated by LTE random access, the user equipment is already downlink synchronized to the cell as it has received downlink synchronization information carried by the synchronization channel. The user equipment has also received the preamble to use in the random access. The random access then consists of four main steps:

1) Transmission of the random-access preamble to the radio base station, allowing the radio base station to estimate the transmission timing of the terminal.
2) The radio base station returns a RA response comprising a timing advance command to adjust the user equipment transmit timing, based on the timing measurement in the first step. This second step therefore establishes uplink (UL) synchronization and also assigns uplink resources to the user equipment to be used in the third step.
3) The user equipment transmits its terminal identity to the radio base station using the UL-Synchronization Channel (SCH).
4) The radio base station returns a contention-resolution message on the DL-SCH.

The transmission of the random access by the user equipment according to the embodiments can involve, in addition to causing an activation of the passive cell, the completion of the four steps of the random access procedure presented above. However, for the purpose of cell activation, it is enough that the user equipment transmits the random access, such as preamble, and then the radio base station confirms that the received preamble is relevant for its cell. Thus, no RA response in 2) and following radio resource control (RRC) signaling in 3) and 4) is actually needed for the purpose of cell activation. The initiated random access procedure could therefore be aborted by the radio base station after reception of the random access.

In such a case, the additional procedure illustrated in FIG. 11 can be initiated. The method continues from step S3 in FIG. 1, where the cell has been activated and its radio base station has started transmission of cell-defining information applicable in the cell. In the next step S20, the user equipment receives this cell-defining information. Transmitted synchronization information allows the user equipment to DL synchronize to the radio base station. The user equipment then uses the cell-defining information for generating and transmitting a traditional random access to the radio base station of the now active cell. This random access transmission and procedure is performed according to a traditional random access as, for instance, outlined above.

A shortened cell activating random access procedure of an embodiment can therefore optionally be complemented with a complete random access procedure once the cell has been activated.

FIG. 12 is a flow diagram illustrating additional optional steps of the controlling method. The method continues from step S21 in FIG. 11. In a next step S30, the user equipment performs signal strength measurements on downlink data received from the radio base station of the activated cell. The estimated signal strength is reported in step S31 to the serving radio base station for the user equipment. There the measurement report can be used for the purpose of selecting a suitable target candidate cell in a handover procedure. The user equipment triggered cell activation therefore also allows previously passive cells to become activated and included as potential candidate cells.

FIG. 13 is a flow diagram illustrating a method of controlled activation of a passive cell in a radio communication network. FIG. 13 illustrates the operations conducted by the radio base station of the passive cell during the controlled cell activation. The method starts in step S40, in which the receiver or receivers of the radio base station for the passive cell receives a random access from user equipment.

The radio base station analyzes the received random access and determines whether it is applicable to its passive cell. In a typical implementation, the random access comprises a preamble. The radio base station has an assigned list or group of at least one preamble that is applicable to the passive cell. If the received preamble is present in the list, the radio base station confirms that the random access is applicable to the passive cell. However, in the case the preamble is not found in the list, the radio base station disregards the random access and continues with having the cell passive.

In step S41 the radio base station has concluded that the received random access is applicable to its passive cell and therefore activates the cell. This cell activation involves starting transmission by its transmitter or transmitters for the cell of cell-defining information associated with the now activated cell in step S42. In this active state, the radio base station more or less continuously or at least periodically, according to a defined transmission scheme, transmits the cell-defining information, which is schematically illustrated by the line L1.

Figure 14:
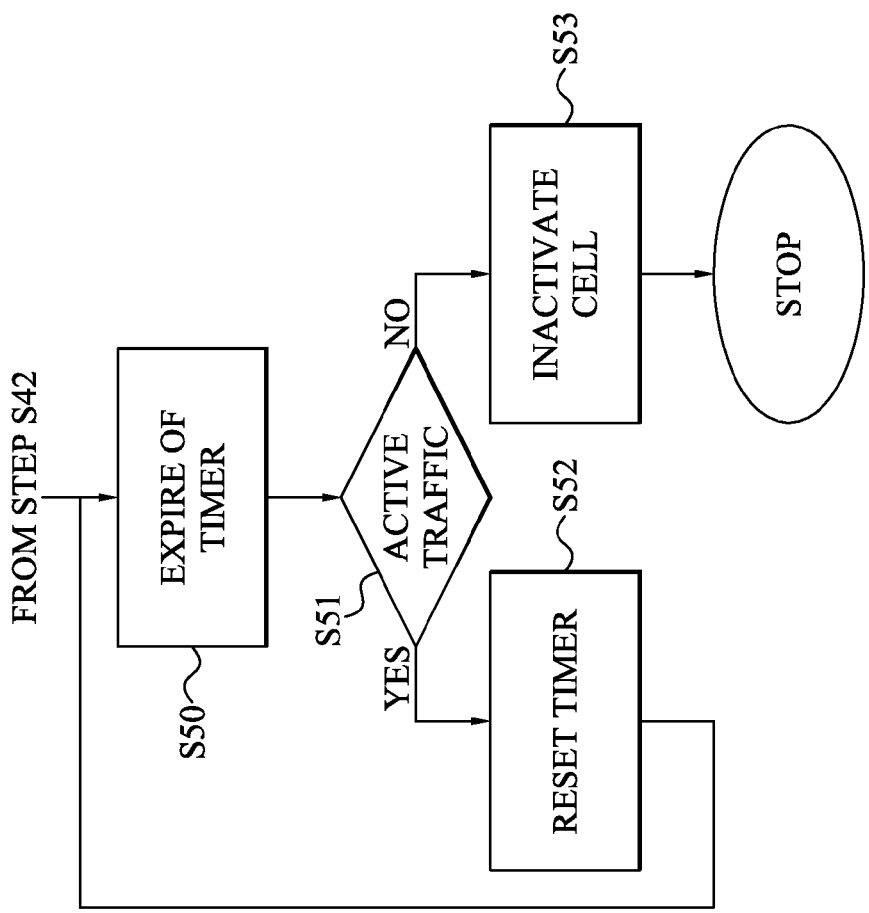
FIG. 14 is a flow diagram of additional, optional steps of the method of controlled cell activation in FIG. 13.

FIG. 14 is a flow diagram illustrating additional optional steps of the controlled cell activation in FIG. 13. The method continues from step S42 in FIG. 13. A next step S50 investigates whether a timer, preferably set upon activation of the cell, has expired. If the timer has expired, step S51 investigates whether there has been any active traffic in the cell during the time window defined by the timer. In other words, step S51 determines whether the radio base station has transmitted any user data to user equipment present within the area of its now active cell and/or whether the radio base station has received any data from user equipment for the cell during the predetermined time period defined by the timer. If no active traffic has been present in the cell, there is no need to keep it active and the radio base station therefore, in step S53, inactivates the cell to thereby once more become passive. The radio base station stops the transmission of the cell-defining information for the cell in step S53 and the method ends.

However, if there is active traffic in the cell as determined in step S51, the method continues to step S52, where the timer is reset. The method continues to step S50 once, the timer has expired. In this way, the radio base station achieves a self control of cell inactivation based on the load situation in the cell whereas cell activation is triggered or at least partly mediated by user equipment.

It is anticipated that the investigation in step S51 does not have to discriminate between no active traffic and active traffic. In clear contrast, a load threshold can be defined and used. Thus, if there is only little active traffic in the cell, i.e. the traffic load is below the threshold it can be economical to inactivate the cell and instead let a neighboring or overlapping cell handle this low amount of traffic. The cell is therefore inactivated once the active user equipment has been handed over to the other cell. If, however, the current traffic load exceeds the threshold, the timer is reset as described above.

Figure 15:
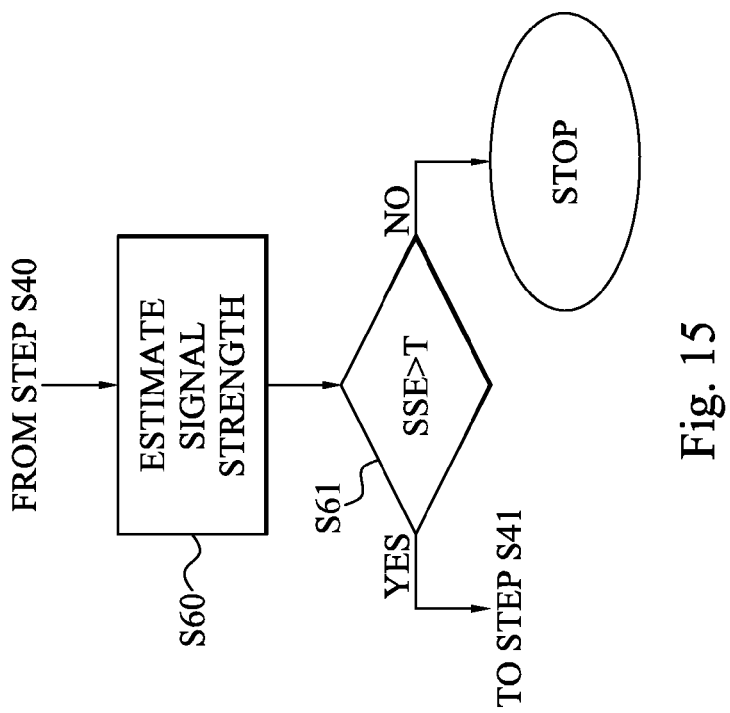
FIG. 15 is a flow diagram of additional, optional steps of the method of controlled cell activation in FIG. 13.

FIG. 15 is a flow diagram illustrating additional, optional steps of the controlled cell activation. The method continues from step S40 in FIG. 13. In a next step S60 the radio base station estimates the uplink signal strength of the received random access. The estimated signal strength is compared in step S61 to a signal strength threshold. If the random access is received at a comparatively high signal strength as determined based on the comparison in step S61, the method continues to step S41 of FIG. 13, where the passive cell is activated. However, if the random access is not received at adequate signal strength, i.e. the estimated signal strength does not exceed the threshold, no cell activation is initiated and the method ends. In this case, the user equipment has to retry transmitting the random access unless a radio base station of some other passive cell successfully received the random access at adequate signal strength.

The procedure illustrated in FIG. 15 is in particular advantageous if the random access is transmitted on a RA group time slot that is shared by several passive cells. Only those passive cells for which their respective radio base stations received the random access at sufficient signal strength should be activated. The reason for this is that receiving the random access at high signal strength implies that the user equipment is typically present close to the radio base station and therefore the radio base station can, if its passive cell is activated, be a good candidate as new serving radio base station for the user equipment. Correspondingly, radio base stations receiving the random access at low signal strength are typically far from the user equipment and therefore not suitable candidates as new serving radio base stations.

As was discussed in the foregoing, the receiver or receivers of the radio base station for the passive cell can be continuously active even if the cell is passive. This is indeed preferred if the user equipment does not have any time synchronization to the radio access network encompassing the radio base station and passive cell. However, if the user equipment is able to identify one or more dedicated RA radio resources or time slots as previously described, the radio base station can save even more power by having its receiver or receivers for the passive cell off and only activate the receiver or receivers during the time period of the dedicated RA time slots. FIG. 16 illustrates this concept. The method starts in step S70, where the radio base station activates at least one receiver adapted for receiving any random access during the predefined RA time slot or slots. The relevant RA time slot can be a time slot dedicated to the particular passive cell, a dedicated RA group time slot, a RA time slot of a neighboring cell in the radio communication network and/or a RA time slot of an overlapping, e.g. macro, cell as discussed in connection with FIGS. 9A to 9C.

The radio base station may have multiple receivers, optionally tuned to different frequency intervals. In such a case, a dedicated RA receiver can be continuously active or activated upon RA time slots when the cell is passive. At least one other receiver is preferably fully inactive if the cell is passive, i.e. even during the RA time slots. FIG. 17 illustrates an additional, optional step with this dual receiver functionality. Once the first, RA receiver has successfully received a random access applicable to the passive cell, the passive cell is activated and the radio base station turns, in step S80, on at least one second receiver in addition to turning on at least one of its transmitters. The dedicated RA receiver is optionally switched off when the cell is active.

The two receivers may operate in different frequency intervals. This means that any random accesses received when the cell is passive are transmitted at a first frequency to which the RA receiver is tuned, whereas any traditional random accesses received when the cell is active are transmitted at a second frequency applicable to the second receiver.

Figure 18:
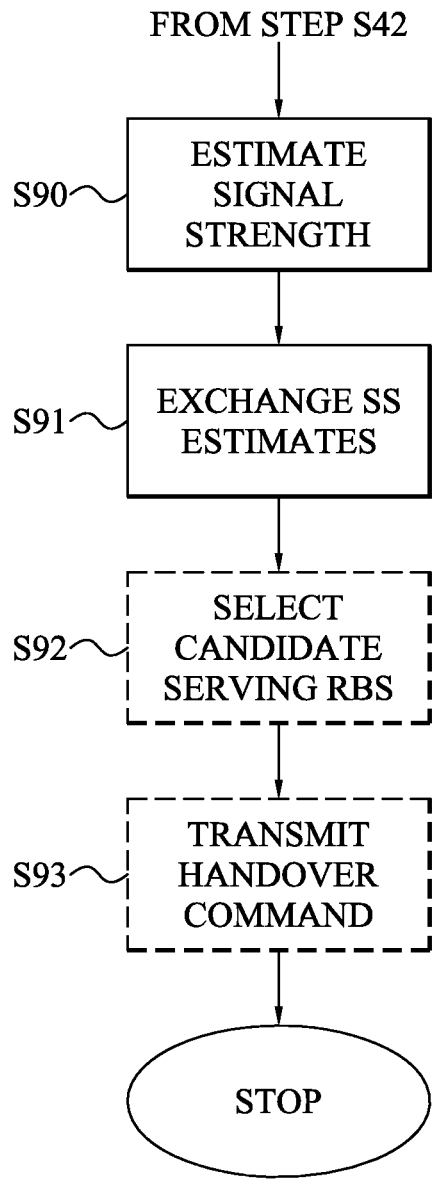
FIG. 18 is a flow diagram of additional, optional steps of the method of controlled cell activation in FIG. 13.

In FIG. 2, multiple neighboring cells 25, 35, 45 are passive. In such a case, when the user equipment 100 transmits a random access, it can be received by the radio base stations 20, 30, 40 of multiple of the passive cells 25, 35, 45. If the random access comprises data, such as preamble, that is applicable to more than one of these passive cells 25, 35, 45, the respective radio base stations 20, 30, 40 preferably estimates the signal strength of the received random access, which is illustrated in step S90 of FIG. 18.

In a next step S91, the radio base stations 20, 30, 40 exchange the signal strength estimates with each other. This step S91 can be implemented by transmitting an estimated signal strength to all its neighboring cells, such as using the X2 interface for a LTE implementation. Alternatively, the radio base stations 20, 30, 40 all forward their respective signal strength estimates to a single radio base station, such as the radio base station 10 of the overlaid, active cell 15.

A further embodiment also involves the exchange of information relating to the energy or power consumption required by the radio base station in order to server the user equipment. In such a case, not only the signal strength estimates but also the energy consumption information is exchanged in step S91, such as using the X2 interface.

In either case, at least one radio base station having access to the multiple signal strength estimates and preferably the energy consumption information preferably compares them in step S92 for the purpose of selecting a suitable candidate serving radio base station for the user equipment 100. This step S92 preferably selects the radio base station having received the random access at the highest signal strength. Alternatively, step S92 selects the radio base station that requires the least amount of energy in order to serve the user equipment but still has an associated estimated signal strength that exceeds an acceptable signal strength threshold as disclosed in connection with FIG. 15.

In such a case, only the selected radio base station needs to activate its passive cell and any other radio base station can remain with their cells inactivated as they are less suitable candidates as new serving radio base station. However, nothing prevents them from also activate their cells.

A handover command is transmitted in step S93 to the user equipment 100, preferably from the currently serving radio base station 10. This handover command triggers the user equipment 100 to initiate a handover procedure to the selected and activated radio base station 20 and cell 25. The method then ends.

Figure 19:
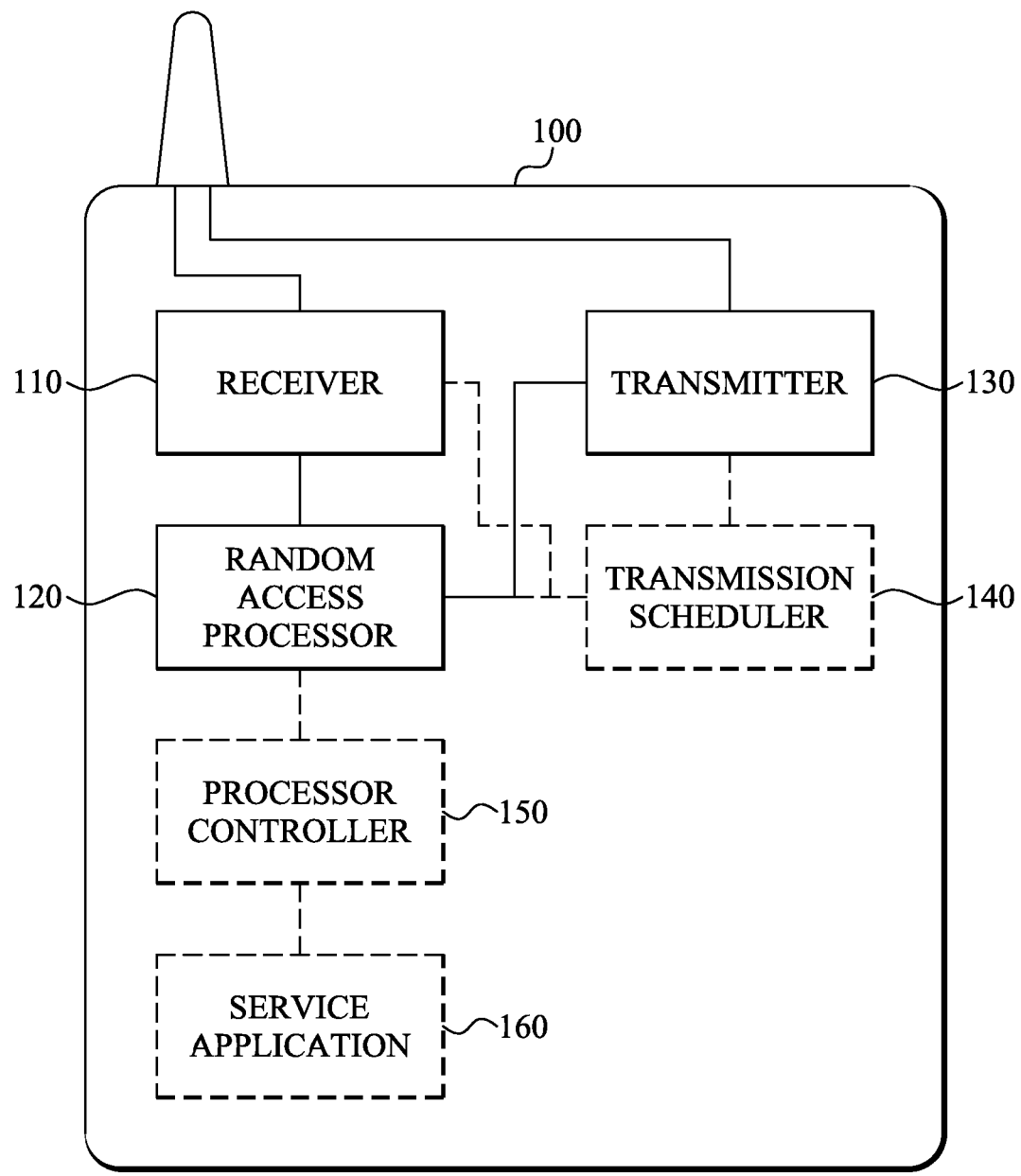
FIG. 19 is a schematic block diagram of user equipment according to an embodiment.

FIG. 19 is a schematic block diagram of user equipment 100 according to an embodiment. The user equipment 100 comprises a receiver 100 for receiving RA-enabling information from a radio base station currently managing an active cell, such as the serving radio base station for the user equipment 100. The RA-enabling information is, however, applicable to a passive cell in the radio communication network.

The RA-enabling information is forwarded to a RA-processor 120 implemented in the user equipment 100 for generating a random access based on the received data. In particular, the RA-processor 120 extracts or calculates at least one preamble from the data provided in the received RA-enabling information. This at least one preamble is compiled and packed into one or more data packets that are transmitted by a connected transmitter 130 as a random access to the radio base station of the passive cell. The RA-processor 120 preferably also extracts information of a frequency, scrambling code, etc. to use by the transmitter 130 when transmitting the random access.

An optional but preferred transmission scheduler 140 is arranged in the user equipment 100 for scheduling transmission of the random access by the transmitter 130 at a particular RA time slot. Synchronization information of the RA time slot is preferably included in the RA-enabling information. In such a case, the RA-processor 120 extracts this synchronization information and forwards it to the transmission scheduler 140. Alternatively, the synchronization information is received separately from the RA-enabling information. The receiver 110 then forwards it directly to the transmission scheduler 140.

The synchronization information preferably defines how the transmission scheduler 140 is to identify the RA time slot in relation to the current frame structure and time base that is used by the currently serving radio base station of the user equipment 100.

The relevant RA time slot can, as has been described in the foregoing, be a RA time slot dedicated to the passive cell, a RA group time slot, a RA time slot dedicated to a neighboring active or passive cell or indeed the RA time slot of the active cell of the serving radio base station.

The random access processor 120 can be configured for compiling the random access directly once the receiver forwards the RA-enabling information. This is in particular advantageous if the RA-enabling information is included in a RA-provoking message originating from, e.g. the serving radio base station or from a core network node, i.e. in the form of a unicast message. However, if the RA-enabling information is instead continuously or periodically broadcast by the radio base station, in the cell area of which the user equipment 100 is currently present, the decision to compile a random access can instead be taken by the user equipment 100. The RA-processor 120 then preferably stores the received RA-enabling information at a storage location (not illustrated) in the user equipment 100.

The user equipment 100 preferably has access to different radio service applications 160 that are used during different communication or media sessions with the radio communication network or other user equipment. If a new radio service application 160 is initiated or a currently running service application 160 now cannot effectively be handled by the serving radio base station, a processor controller 150 becomes activated and triggers the RA-processor 120 to start compiling the random access, such as based on the RA-enabling information previously entered in the storage location.

Once the radio base station of the passive cell has received the random access transmitted by the transmitter 130, it activates the cell and starts transmitting the cell-defining information. This cell-defining information is received by the receiver 110. In an optional embodiment, the random access processor 120 can use this information for compiling a traditional random access that is transmitted by the transmitter 130 to the radio base station for the purpose of initiating and performing a complete random access procedure with the radio base station.

The units 110 to 160 of the user equipment 100 may be implemented in hardware, software or a combination of hardware and software.

Figure 20:
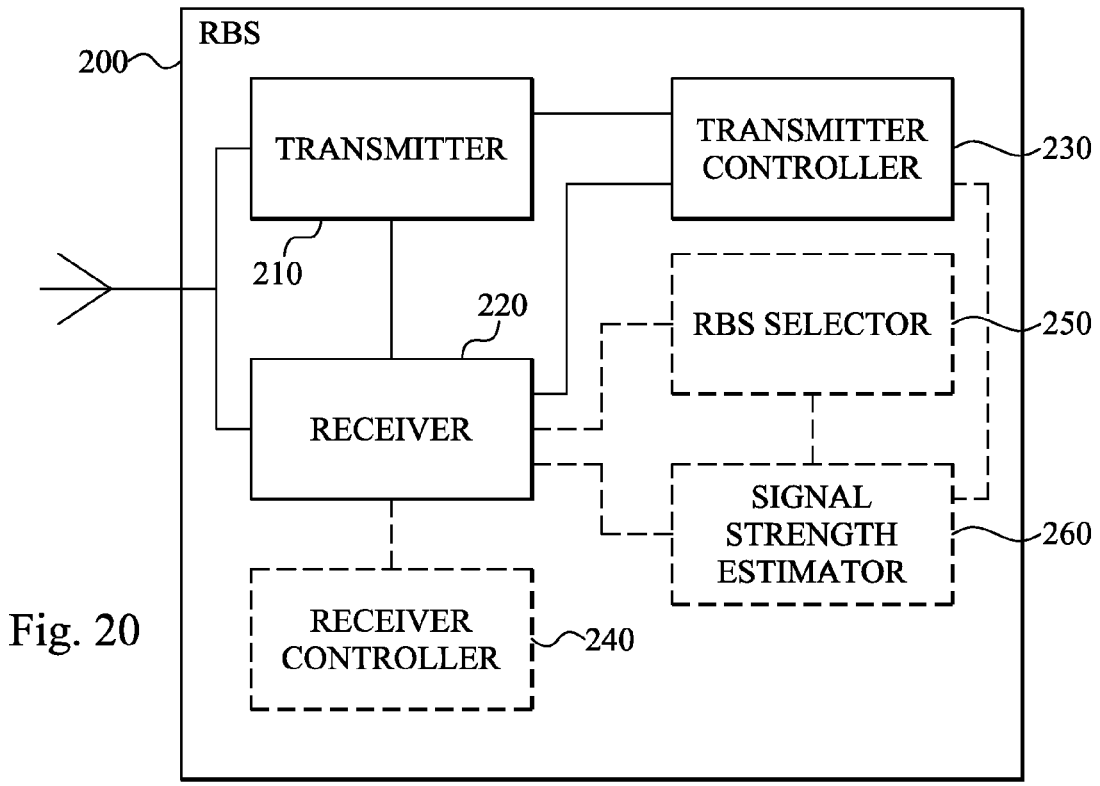
FIG. 20 is a schematic block diagram of a radio base station according to an embodiment.

FIG. 20 is a schematic block diagram of an embodiment of a radio base station 200. The radio base station 200 comprises at least one transmitter 210 dedicated or assigned for a cell that is currently passive. This means that the transmitter 210 is turned off and does not transmit any cell-defining information for the passive cell. The transmitter 210 of course does also not transmit any other data for the passive cell.

At least one receiver 220 of the radio base station dedicated or assigned for the passive cell is at least temporarily active to receive a random access from user equipment. The random access is forwarded to a transmitter controller 230 that preferably analyzes the random access in order to determine whether it is applicable to the passive cell or should be ignored. For instance, the transmitter controller 230 can extract a preamble present in the random access message and compare it to a list of at least one preamble applicable to the passive cell and present in a storage location (not illustrated) of the radio base station 200.

If the random access is applicable to the passive cell, the transmitter controller 230 activates the passive cell by triggering the transmitter 210 to become activated and start transmission of cell-defining information for the cell.

The radio base station 200 preferably also has access to a timer (not illustrated). When this timer has expired and no or only very low amount of active traffic is or has been present in the active cell as previously described, the transmitter controller 230 can once more inactive the cell by inactivating the transmitter 210 to shut down the transmission of the cell-defining information for the cell.

In an embodiment, the receiver 220 of the radio base station 200 is not continuously active when the cell is passive. In clear contrast, a receiver controller 240 is implemented for activating the receiver 220 during one or more predefined RA time slots and then deactivating the receiver 220 in the time between such RA time slots.

An optional signal strength estimator 260 is arranged in the radio base station 200 for estimating the signal strength of the random access received by the receiver 220. The estimated signal strength is forwarded to the transmitter controller 230 that compares it to a signal strength threshold. If the random access is received at sufficient signal strength, i.e. the estimated signal strength exceeds the threshold, the transmitter controller 230 activates the passive cell as previously described. Otherwise the random access is ignored and no cell activation is initiated.

The estimated signal strength may optionally be forwarded to at least one other radio base station for the purpose of selecting candidate serving radio base station and/or selecting passive cell to activate.

The radio base station 200 may optionally also include a unit (not illustrated) for estimating energy/power consumption required for serving the RA-transmitting user equipment. The unit also preferably generates information descriptive of this estimated energy consumption. The information can be forwarded in similarity to the estimated signal strength.

If the radio base station 200 instead or in addition receives signal strength estimates and optionally energy consumption information from other radio base stations in the radio communication network, these are forwarded to a radio base station selector 250 that selects a candidate serving radio base station based on the received estimates and the estimate from the signal strength estimator 260 and the energy consumption information as previously described.

The units 210 to 260 of the radio base station 200 may be implemented in hardware, software or a combination of hardware and software. The units 210 to 260 may all be implemented at a same site in the radio communication network or indeed be distributed at multiple geographical sites that are though collectively handled as a single radio base station or (e)NodeB.

Figure 21:
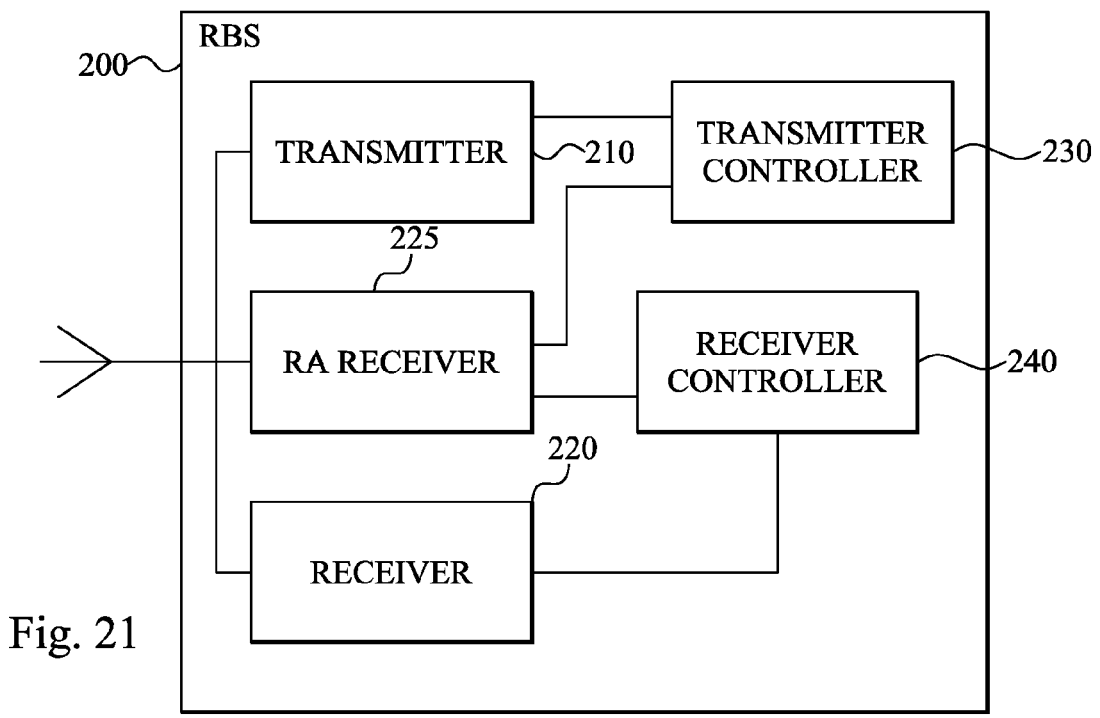
FIG. 21 is a schematic block diagram of a radio base station according to another embodiment.

FIG. 21 is a schematic block diagram of another embodiment of the radio base station 200. This embodiment can comprises all the units illustrated in FIG. 20 or only a portion thereof as illustrated in the figure. This embodiment comprises at least one dedicated RA receiver 225 that is continuously active or activated by a receiver controller at specific RA time slots when the cell is passive.

If the RA receiver 225 receives a RA access that is applicable to the passive cell, the transmitter controller 230 activates the cell and the transmitter 210 starts transmitting the cell-defining information. In addition, a receiver controller 240 activates at least one other receiver 220 that is only used when the cell is active. The receiver controller 240 may optionally also inactive the RA receiver 225 when the cell is active and then reactive the RA receiver 225 if the cell once more becomes passive. In such a case, the other receiver 220 is preferably switched off.

The units 210 to 240 of the radio base station 200 may be implemented in hardware, software or a combination of hardware and software. The units 210 to 240 may all be implemented at a same site in the radio communication network or indeed be distributed at multiple geographical sites that are though collectively handled as a single radio base station or (e)NodeB.

In the above presented block diagrams of FIGS. 19 to 21 only the units directly involved in the controlled cell activation as disclosed herein are explicitly illustrated. It is therefore anticipated that the user equipment and radio base station comprises other units and functionalities used in their traditional operations.

It will be understood by a person skilled in the art that various modifications and changes may be made to the present invention without departure from the scope thereof, which is defined by the appended claims.

The invention claimed is:

1. A method implemented by a user equipment of controlling activation of at least one cell in a radio communication network comprising a number of radio base stations, said method comprising:

receiving, from a radio base station managing an active cell, random access enabling information applicable to a passive other cell of a radio base station currently not transmitting any cell-defining information for said other cell; and transmitting, based on said random access enabling information, a random access to said radio base station of said other cell to activate said other cell and cause said radio base station of said other cell to start transmission of cell-defining information for said other cell.

2. The method of claim 1, wherein an area of said other cell at least partly overlaps an area of said active cell, and wherein receiving said random access enabling information comprises receiving said random access enabling information as broadcast information transmitted by said radio base station of said active cell.

3. The method of claim 1, wherein said active cell is associated with a first radio access network and said other cell is associated with a second radio access network, and wherein receiving said random access enabling information comprises receiving said random access enabling information comprised in a random access provoking message originating from a core network of said first radio access network.

4. The method of claim 1, wherein said radio base station of said active cell comprises a serving radio base station for said user equipment, and wherein receiving said random access enabling information comprises receiving said random access enabling information comprised in a random access provoking message unicast by said serving radio base station.

5. The method of claim 1, wherein receiving said random access enabling information comprises receiving information of a frequency at which said random access should be transmitted and a random access preamble applicable in said other cell.

6. The method of claim 1, further comprising scheduling transmission of said random access to said radio base station of said other cell based on synchronization information descriptive of a time synchronization between said radio base station of said active cell and said radio base station of said other cell.

7. The method of claim 1, further comprising scheduling, based on said random access enabling information, transmission of said random access to said radio base station of said other cell at a random access time slot dedicated for a group of cells in said radio communication network, said group of cells comprising said other cell.

8. The method of claim 1, further comprising scheduling, based on said random access enabling information, transmission of said random access to said radio base station of said other cell at a random access time slot specific for said active cell.

9. The method of claim 1, further comprising scheduling, based on said random access enabling information, transmission of said random access to said radio base station of said other cell at a random access time slot specific for a neighboring cell in said radio communication network relative to said other cell.

10. The method of claim 1, further comprising determining whether to generate said random access based on a radio communication service of said user equipment.

11. A method implemented by a radio base station of controlled activation of an associated cell in a radio communication network comprising a number of radio base stations, wherein said radio base station does not transmit any cell-identifying information for said associated cell when said associated cell is in a passive state, said method comprising:

listening for a random access from user equipment on a random access slot specific to a group of cells in said radio communication network, said group of cells comprising said associated cell, or on a random access slot specific for a neighboring cell in said radio communication network relative to said associated cell;

receiving said random access from said user equipment; and activating, based on said random access, said associated cell by activating said radio base station to transmit cell-defining information.

12. The method of claim 11, further comprising setting said associated cell in said passive state in which said radio base station does not transmit any cell-defining information for said associated cell if no user data is transmitted by said radio base station for said associated cell within a predetermined time period and if no data is received by said radio base station for said associated cell during said predetermined time period.

13. The method of claim 11, further comprising said radio base station activating a receiver in said radio base station that is to receive a random access during said random access slot.

14. The method of claim 11, wherein receiving said random access comprises receiving said random access by a first receiver operating on a first frequency interval, said method further comprising activating, based on said random access, a second receiver operating on a second frequency interval.

15. The method of claim 11, further comprising:
estimating a signal strength of said random access;
receiving information of an estimated signal strength from a radio base station of a neighboring cell in said radio communication network, said estimated signal strength from said radio base station of said neighboring cell being associated with said user equipment; and
selecting, based on said estimated signal strength and said received signal strength, a candidate serving radio base station for said user equipment among said radio base station and said radio base station of said neighboring cell.

16. A user equipment comprising:
a receiver for receiving, from a radio base station managing an active cell in a radio communication network comprising a number of radio base stations, random access enabling information applicable to a passive other cell of a radio base station currently not transmitting any cell-defining information for said other cell;
a random access processor configured to generate a random access based on said random access enabling information received by said receiver; and
a transmitter for transmitting said random access to said radio base station of said other cell to activate said other cell and cause said radio base station of said other cell to start transmission of cell-defining information for said other cell.

17. The user equipment of claim 16, further comprising a transmission scheduler to schedule transmission of said random access to said radio base station of said other cell based on synchronization information descriptive of a time synchronization between said radio base station of said active cell and said radio base station of said other cell.

18. The user equipment of claim 16, further comprising a processor controller to activate, based on a radio communication service of said user equipment, said random access processor to generate said random access.

19. A radio base station comprising:
a transmitter that does not transmit any cell-defining information for an associated cell of said radio base station when said associated cell is in a passive state;
a receiver for listening for a random access from user equipment on a random access slot specific to a group of cells in a radio communication network, said group of cells comprising said associated cell, or on a random access slot specific for a neighboring cell in said radio communication network relative said associated cell and for receiving said random access from said user equipment; and
a transmitter controller to activate, based on said random access received by said receiver, said associated cell by activating said transmitter to transmit cell-defining information.

20. The radio base station of claim 19, wherein said transmitter controller is to set said associated cell in said passive state by inactivating said transmitter to not transmit any cell-defining information for said associated cell if no user data is transmitted by said transmitter for said associated cell within a predetermined time period and if no data is received by said receiver for said associated cell during said predetermined time period.

21. The radio base station of claim 19, further comprising a receiver controller to activate said receiver during a random access slot.

22. The radio base station of claim 19, wherein said receiver comprises a first receiver that operates on a first frequency interval, said radio base station further comprising:
another receiver operating on a second frequency interval; and
a receiver controller to activate said another receiver based on said random access received by said first receiver.

* * * * *